(12) United States Patent
Huang et al.

(10) Patent No.: US 12,407,767 B2
(45) Date of Patent: *Sep. 2, 2025

(54) FOLDABLE ELECTRONIC DEVICE

(71) Applicant: SYNCMOLD ENTERPRISE CORP., New Taipei (TW)

(72) Inventors: Chun-Hao Huang, New Taipei (TW); Chien-Cheng Yeh, New Taipei (TW); Ching-Hui Yen, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 406 days.

This patent is subject to a terminal disclaimer.

(21) Appl. No.: 18/077,500

(22) Filed: Dec. 8, 2022

(65) Prior Publication Data

US 2023/0102766 A1    Mar. 30, 2023

Related U.S. Application Data

(63) Continuation-in-part of application No. 17/837,425, filed on Jun. 10, 2022, now Pat. No. 11,843,710.

(60) Provisional application No. 63/211,777, filed on Jun. 17, 2021.

(30) Foreign Application Priority Data

Mar. 10, 2022 (TW) .................................. 111202403

(51) Int. Cl.
*H04M 1/02* (2006.01)
*H04W 88/02* (2009.01)

(52) U.S. Cl.
CPC ................................ *H04M 1/0216* (2013.01)

(58) Field of Classification Search
CPC ............................................... H04W 88/00–06
See application file for complete search history.

(56) References Cited

U.S. PATENT DOCUMENTS

| 11,178,779 | B2* | 11/2021 | Sim | G09F 9/301 |
| 2012/0200991 | A1* | 8/2012 | Ryu | G06F 1/1601 |
| | | | | 361/679.01 |
| 2018/0011515 | A1* | 1/2018 | Yoo | G06F 1/1681 |
| 2020/0204666 | A1* | 6/2020 | Hong | G06F 1/203 |
| 2020/0363843 | A1* | 11/2020 | Cheng | G06F 1/1681 |

(Continued)

FOREIGN PATENT DOCUMENTS

TW    M620175 U    11/2021

*Primary Examiner* — San Htun
(74) *Attorney, Agent, or Firm* — MUNCY, GEISSLER, OLDS & LOWE, P.C.

(57) ABSTRACT

A foldable electronic device includes a central body, a linkage unit, a plurality of operating mechanisms, and a plurality of panel bodies. The linkage unit includes a plurality of driving shafts. Each of the operating mechanism has a wing rod, a lifting plate, and a connecting rod. The wing rod is fixed to the lifting plate. The wing rod and the connecting rod pivotally connecting to the central body and the driving shaft respectively. When the panel bodies are in a folded status, a flexible screen is bent, and the wing rod, the lifting plate, and the central body collectively define a yielding space for accommodating a flexible section of the flexible section. The supporting plate at the bottom of the flexible screen has a weakening structure corresponding to the flexible section.

19 Claims, 34 Drawing Sheets

(56) References Cited

U.S. PATENT DOCUMENTS

2021/0181808 A1\* 6/2021 Liao ...................... G06F 1/1652
2022/0263931 A1\* 8/2022 Ma ........................ G06F 1/1681

\* cited by examiner

FOLDABLE ELECTRONIC DEVICE

CROSS REFERENCE TO RELATED APPLICATION

This present application is a continuation-in-part of U.S. application Ser. No. 17/837,425 filed on Jun. 10, 2022 and entitled "FOLDABLE ELECTRONIC DEVICE". The U.S. application Ser. No. 17/837,425 claims the benefits of U.S. Provisional Application Ser. No. 63/211,777 filed on Jun. 17, 2021, and the benefit of Taiwan Patent Application Serial No. 111202403 filed on Mar. 10, 2022. The entirety of each Application is incorporated herein by reference.

BACKGROUND OF THE INVENTION

1. Field of the Invention

The present invention relates to a foldable electronic device, especially a foldable electronic device with a flexible screen.

2. Description of Related Art

Currently known foldable electronic devices such as those disclosed in Taiwan patent application TW M620175 omit the conventional hinge module, and use a plurality of four connecting rods combining other components to provide a yielding space for accommodating the flexible section. In detail, when the conventional foldable electronic device is folded, the first lifting plate and the second lifting plate can be moved correspondingly through the four connecting rods, and the yielding space for accommodating the flexible section can be defined by a stationary shell, a first lifting plate and a second lifting plate collectively to fit the flexible section according to the bending degree of the flexible screen.

The present invention further provides a foldable electronic device, which includes a linkage mechanism different from the aforementioned conventional linkage mechanism. A weakening structure is formed on the supporting plate of the flexible screen and is corresponding to the flexible section.

SUMMARY OF THE INVENTION

An objective of the present invention is to provide a foldable electronic device which has a plurality of operating mechanism. Each of the operating mechanism includes a driving shaft, a wing rod, and a connecting rod. The driving shaft, the wing rod, and the connecting rod are pivotally connected to the central body, and the wing rod and the connecting rod are further connected to the driving shaft. An end of the wing rod and an end of the connecting rod are able to slide in an arc groove and a sliding groove of the driving shaft respectively to provide, with other components, a yielding space for accommodating a flexible section. When the foldable electronic device of the present invention is in the folded status, the two lifting plates moves in response to the movement of the driving shaft, the wing rod and the connecting rod, the central body and the lifting plate collectively define a yielding space suitable for accommodating the flexible section according to a bending degree of the flexible section of the flexible screen. The supporting plate disposed at the bottom of the flexible screen has a weakening structure which is located corresponding to the flexible section to provide support to the flexible screen when the flexible screen is bent.

To achieve the aforesaid objective, the present invention discloses a foldable electronic device which includes a central body, a linkage unit, a first operating mechanism, a second operating mechanism, a first panel body, a second panel body, and a flexible screen. The central body includes a stationary shell, an accommodating space, a first shaft and a second shaft. The stationary shell defines the accommodating space, the first shaft and the second shaft are disposed in the accommodating space, the first shaft extends along a first central axis, and the second shaft extends along a second central axis. The linkage unit includes a first driving shaft and a second driving shaft. The first driving shaft is pivotally connected to the stationary shell on a first rotating axis and has a first sliding groove and a first arc groove, and the second driving shaft is pivotally connected to the stationary shell on a second rotating axis and has a second sliding groove and a second arc groove. The first operating mechanism includes a first wing rod, a first lifting plate, and a first connecting rod. The first wing rod is pivotally connected to the stationary shell on a first pivoting axis and is pivotally connected to the first driving shaft. The first wing rod has a first supporting surface and a first protruding end. The first protruding end is slidably disposed in the first arc groove. The first lifting plate is fixed to the first wing rod and has a first lifting surface substantially contacting with the first supporting surface in parallel. The first connecting rod is fixed to the first shaft and is pivotally connected to the first driving shaft. A first rod end of the first connecting rod is slidably disposed in the first sliding groove. The second operating mechanism includes a second wing rod, a second lifting plate, and a second connecting rod. The second wing rod is pivotally connected to the stationary shell on a second pivoting axis and is pivotally connected to the second driving shaft. The second wing rod has a second supporting surface and a second protruding end. The second protruding end is slidably disposed in the second arc groove. The second lifting plate is fixed to the second wing rod and has a second lifting surface substantially contacting with the second supporting surface in parallel. The second connecting rod is fixed to the second shaft and is pivotally connected to the second driving shaft. A second rod end of the second connecting rod is slidably disposed in the sliding groove sliding groove. The first panel body is disposed on one side of the stationary shell and is linking up with the first driving shaft. The second panel body is disposed on another side of the stationary shell and is linking up with the second driving shaft. The flexible screen is disposed on the first panel body and second panel body and defines a flexible section, wherein the flexible screen includes a supporting plate connecting with the first panel plate and the second panel plate, and a multi-layer structure being disposed on the supporting plate, and wherein the supporting plate has a weakening structure corresponding to the flexible section. The first panel body and the second panel body are transformed between an unfolded status and a folded status. When the first panel body and the second panel body are in the unfolded status, the flexible screen is flattened, and the first wing rod, the first lifting plate, the second wing rod, the second lifting plate and the stationary shell collectively support the flexible section. When the first panel body and the second panel body are in the folded status, the weakening structure allows the flexible screen to bend at the flexible section, and the first wing rod, the first lifting plate, the second wing rod, the second lifting plate and the stationary shell collectively define a yielding space for accommodating the flexible section.

When the first panel body and the second panel body are transformed from the unfolded status to the folded status, the first panel body drives the first driving shaft rotate about the first rotating axis, the second panel body drives the second driving shaft rotate about the second rotating axis, the first protruding end and the second protruding end slide in the first arc groove and the second arc groove respectively, the first rod end and the second rod end slide in the first sliding groove and the second sliding groove respectively, the first connecting rod and the second connecting rod correspondingly rotate about the first central axis and the second central axis respectively, and the first wing rod and the second wing rod correspondingly rotate about the first pivoting axis and the second pivoting axis respectively, and drive the first lifting plate and the second lifting plate respectively to rotate with respect to the stationary shell.

The flexible section further has a first deformation area, a second deformation area and a third deformation area disposed between the first deformation area and the second deformation area. The first deformation area corresponds to the first panel body, the second deformation area corresponds to the second panel body, and the third deformation area corresponds to the central body.

The weakening structure further has a plurality of first groove groups and a plurality of second groove groups which are respectively extending along a first longitudinal direction and alternately arranged with each other in a main longitudinal direction, wherein the first longitudinal direction is parallel to the first central axis and the second central axis, and perpendicular to the main longitudinal direction. The weakening structure is able to bend in the main longitudinal direction when the first panel body and the second panel body are transformed from the unfolded status to the folded status.

Each of the first groove groups has a plurality of first groove portions sequentially arranged along the first longitudinal direction, and each of the second groove groups has a plurality of second groove portions sequentially arranged along the first longitudinal direction, and wherein the first groove portion and the second groove portion, which are adjacent, are staggered from each other.

Each of the first groove portions has a first groove, and each of the second groove portions has a second groove, and wherein the first groove and the second groove penetrate through the supporting plate respectively.

In one embodiment, the first deformation area, the second deformation area and the third deformation area are continuously arranged.

When the first panel body and the second panel body are in the unfolded status, the first lifting surface and the second lifting surface are substantially coplanar; and when the first panel body and the second panel body are in the folded status, the first lifting surface and the second lifting surface are substantially spaced apart and in parallel.

The first central axis, the second central axis, the first rotating axis, the second rotating axis, the first pivoting axis, and the second pivoting axis are not overlapping.

The first driving shaft further has a first main body and a first protruding part, the first main body extends along the main longitudinal direction, the first protruding part is disposed on the first main body, the first arc groove extends from the first main body to the first protruding part, and the first sliding groove is formed on the first main body. The second driving shaft further has a second main body and a second protruding part, the second main body extends along the main longitudinal direction, the second protruding part is disposed on the second main body, the second arc groove extends from the second main body to the second protruding part, and the second sliding groove is formed on the second main body.

The main longitudinal direction is perpendicular to the first central axis and the second central axis. The first driving shaft further has a first embedding slot formed on the first main body and communicated with the first sliding groove. The first connecting rod further has a first rod body connected with the first rod end and accommodated in the first embedding slot. The second driving shaft further has a second embedding slot formed on the second main body and communicated with the second sliding groove. The second connecting rod further has a second rod body connected with the second rod end and accommodated in the second embedding slot.

The first driving shaft is pivotally connected with the first connecting rod on a first connecting axis, and pivotally connected with the first wing rod on a first subordinate connecting axis. The second driving shaft is pivotally connected with the second connecting rod on a second connecting axis, and pivotally connected with the second wing rod on a second subordinate connecting axis.

The first panel body includes a first outer surface distant from the flexible screen, and the second panel body includes a second outer surface distant from the flexible screen. When the first panel body and the second panel body are in the unfolded status, a perpendicular line segment between the first subordinate connecting axis and the first pivoting axis is more distant from the first outer surface than a perpendicular line segment between the first connecting axis and the first central axis, and a perpendicular line segment between the second subordinate connecting axis and the second pivoting axis is more distant from the second outer surface than a perpendicular line segment between the second connecting axis and the second central axis. When the first panel body and the second panel body are in the folded status, the perpendicular line segment between the first subordinate connecting axis and the first pivoting axis is more adjacent to the first outer surface than the perpendicular line segment between the first connecting axis and the first central axis, and the perpendicular line segment between the second subordinate connecting axis and the second pivoting axis is more adjacent to the second outer surface than the perpendicular line segment between the second connecting axis and the second central axis.

The first panel body further includes a first side shell and a first support block and is disposed on one side of the stationary shell to be operatively linked with the first driving shaft. The first support block is disposed in the first side shell. The first lifting plate is disposed between the first support block and the stationary shell to operate in the first side shell correspondingly. The second panel body further includes a second side shell and a second support block and is disposed on the other side of the stationary shell to be operatively linked with the second driving shaft. The second support block is disposed in the second side shell, and the second lifting plate is disposed between the second support block and the stationary shell to operate in the second side shell correspondingly.

The first panel body further includes a first covering plate and a plurality of first inserting columns. The first inserting columns are formed on the first covering plate with intervals and pass through the flexible screen and the first support block to be fixed to the first side shell. The second panel body further includes a second covering plate and a plurality of second inserting columns. The second inserting columns are formed on the second covering plate with intervals and pass through the flexible screen and the second support block to be fixed to the second side shell. The first covering plate, the first side shell, the second covering plate and the second side shell hold the flexible screen collectively.

In an embodiment of the present invention, the foldable electronic device further includes a first positioning module. The first positioning module has a first driving cam, a first driven cam and a first elastic member. The first driving cam is fixed to the first shaft, and has a first main-tooth. The first driven cam is slidably sleeved on the first shaft along the first central axis and has a first tooth space, a second tooth space and a first sub-tooth. The first sub-tooth is located between the first tooth space and the second tooth space. The first elastic element is disposed between the first driven cam and a fixed plate of the stationary shell. When the first panel body and the second panel body are in the unfolded status, the first main-tooth is located in the first tooth space. When the first panel body and the second panel body are in a half-folded status, the first main-tooth abuts against the first sub-tooth so that the first elastic element is compressed. When the first panel body and the second panel body are in the folded status, the first main-tooth moves into the second tooth space, and the first elastic element is released.

The foldable electronic device further includes a second positioning module. The second positioning module includes a second driving cam, a second driven cam and a second elastic element. The second driving cam is fixed to the second shaft, and has a second main-tooth. The second driven cam is slidably sleeved on the second shaft along the second central axis and has a third tooth space, a fourth tooth space and a second sub-tooth. The second sub-tooth is located between the third tooth space and the fourth tooth space. The second elastic element is disposed between the second driven cam and the fixed plate of the stationary shell. When the first panel body and the second panel body are in the unfolded status, the second main-tooth is located in the third tooth space. When the first panel body and the second panel body are in the half-folded status, the second main-tooth abuts against the second sub-tooth so that the first elastic element and the second elastic element are compressed. When the first panel body and the second panel body are in the folded status, the second main-tooth moves into the fourth tooth space, and the second elastic element is released.

The foldable electronic device of the present invention further includes a synchronous module, which has a first gear and a second gear. The first gear is sleeved on the first shaft, the second gear is sleeved on the second shaft, and the first gear and the second gear are engaged with each other. When the first shaft rotates about the first central axis or the second shaft rotates about the second central axis, the first gear or the second gear rotates correspondingly and drives the second gear or the first gear to rotate so that the second shaft or the first shaft rotates synchronously with the second gear or the first gear correspondingly.

In one embodiment of the present invention, the first shaft, the second shaft, the linkage unit, the first wing rod, the first connecting rod, the second wing rod, the second connecting rod, the first positioning module, the second positioning module and the synchronous module are duplicated and disposed on two sides of the stationary shell respectively and correspondingly.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
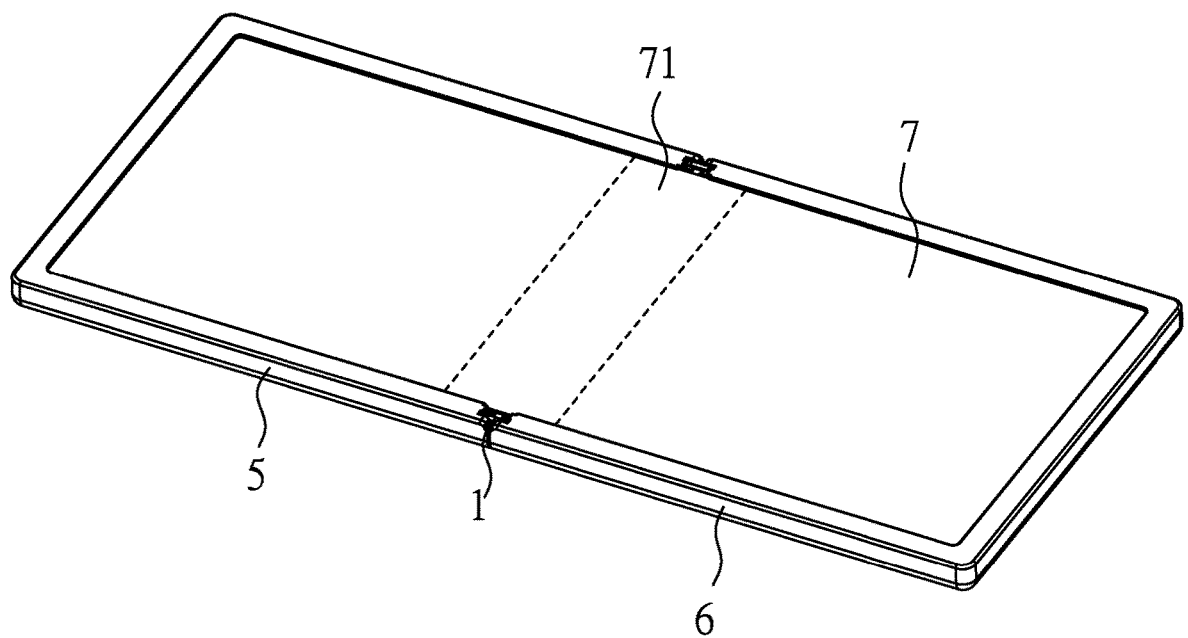
FIG. 1 is a three-dimensional schematic view of the foldable electronic device in the unfolded status according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
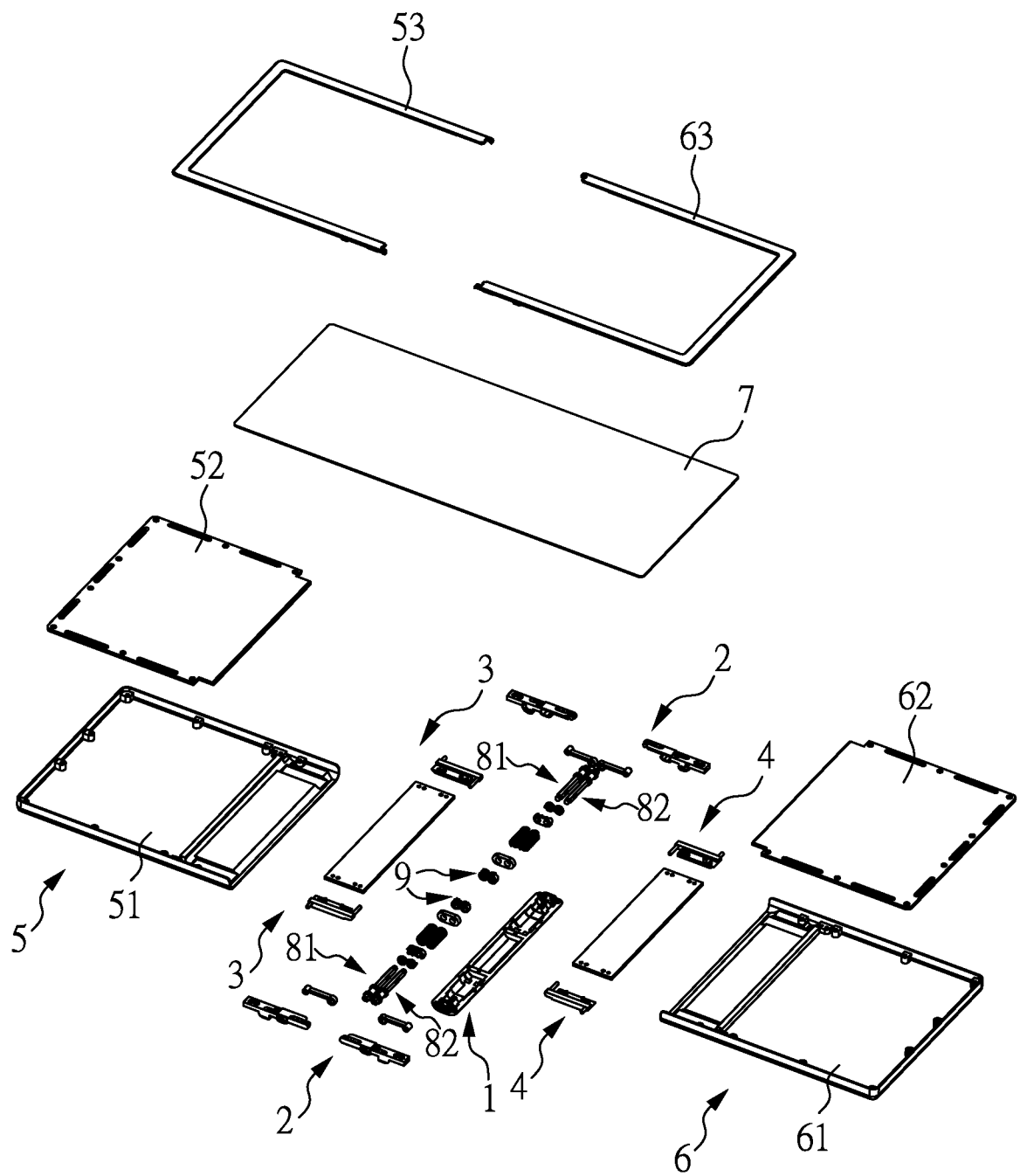
FIG. 2 is an explosive view of the foldable electronic device according to the present invention.

As shown in FIG. 1 and FIG. 2, the foldable electronic device 1000 of the present invention takes a foldable mobile phone as an example. The foldable electronic device 1000 includes a central body 1, two linkage units 2, a first operating mechanism 3, a second operating mechanism 4, a first panel body 5, a second panel body 6, a flexible screen 7, two first positioning modules 81, two second positioning modules 82 and two synchronization modules 9.

Figure 3:
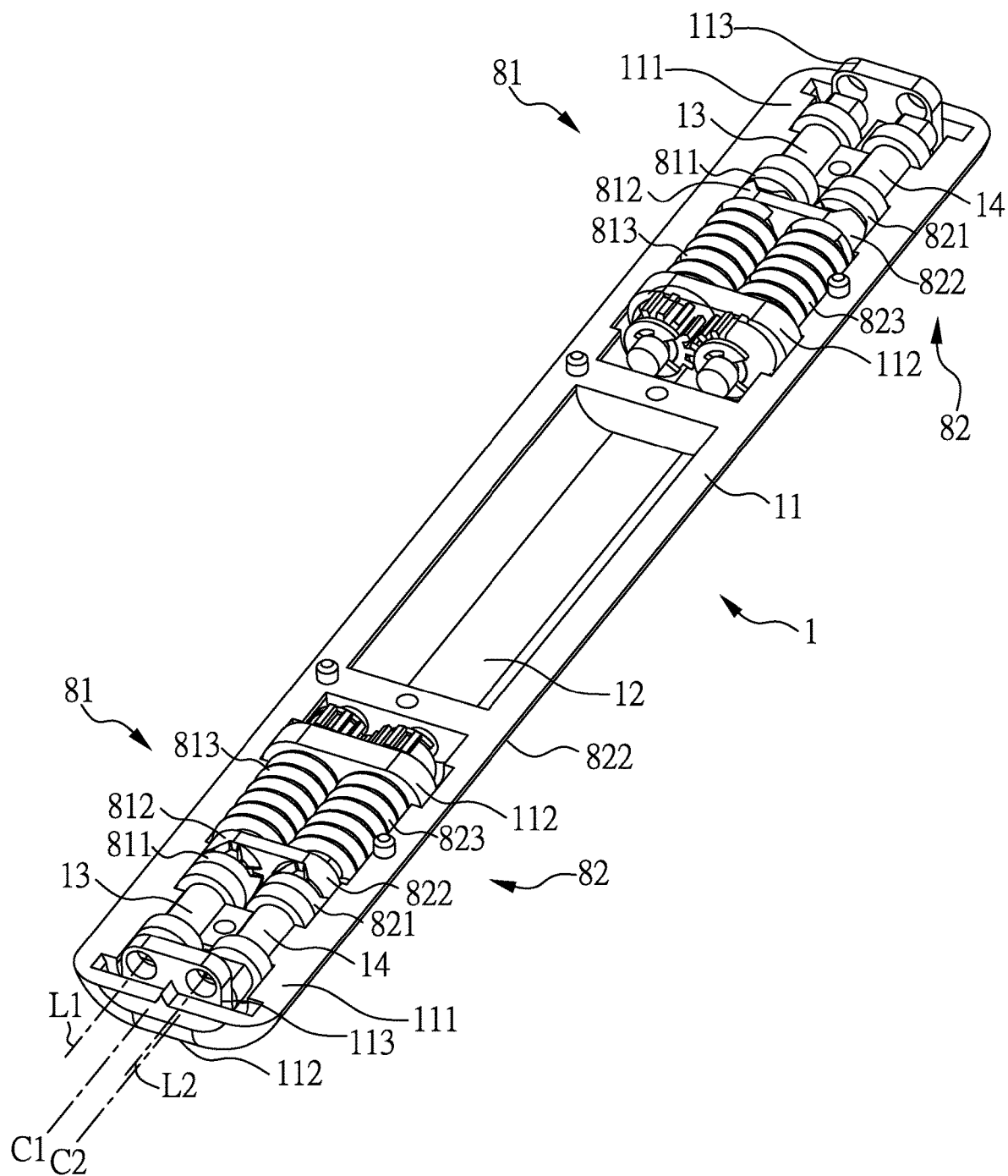
FIG. 3 is an assembly view of the central body, the first positioning module, the second positioning module and the synchronous module of the foldable electronic device according to the present invention.
Figure 4:
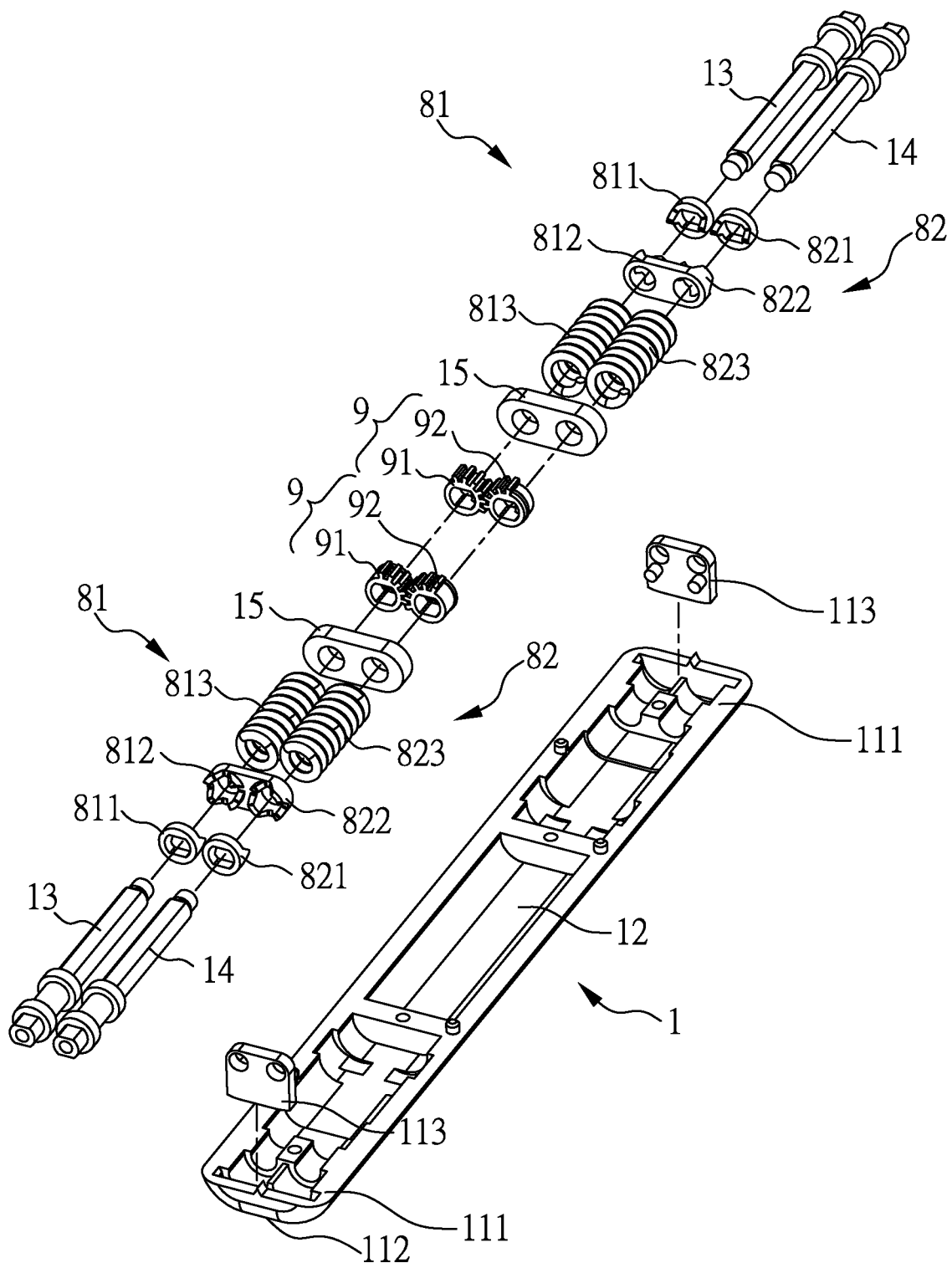
FIG. 4 is an explosive view of the central body, the first positioning module, the second positioning module and the synchronous module of the foldable electronic device according to the present invention.

As shown in FIG. 3 and FIG. 4, the central body 1 includes a stationary shell 11, an accommodating space 12, two first shafts 13, two second shafts 14 and two fixed plates 15. The stationary shell 11 extends substantially parallel to a first central axis C1 and a second central axis C2, and has two ends 111 and two extending plates 113. Each extending plate 113 extends from each end 111. The stationary shell 11 defines the accommodating space 12. The first shaft 13 and the second shaft 14 are disposed in the accommodating space 12. The first shafts 13 are spaced apart and extend along the first central axis C1, and the second shafts 14 are spaced apart and extend along the second central axis C2. Each first shaft 13 and each second shaft 14 are arranged side by side at each end 111 of the stationary shell 11 and abut against each extending plate 113. The fixed plates 15 are spaced apart from each other and are arranged at the center of the stationary shell 11.

Figure 5:
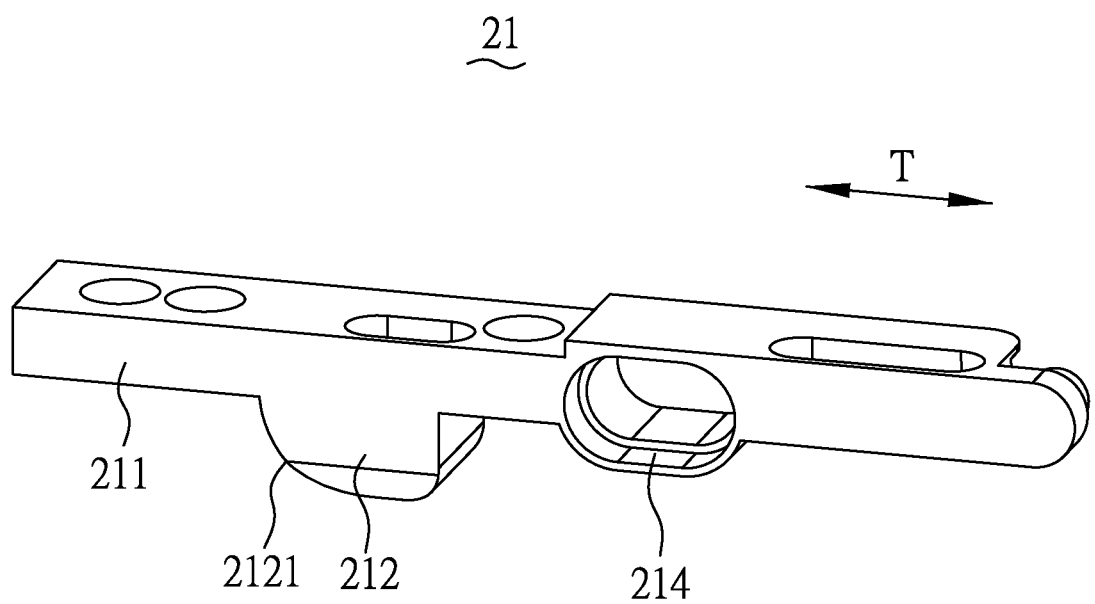
FIG. 5 and FIG. 6 are three-dimensional schematic views of the first driving shaft of the foldable electronic device from different viewing angles according to the present invention.
Figure 6:
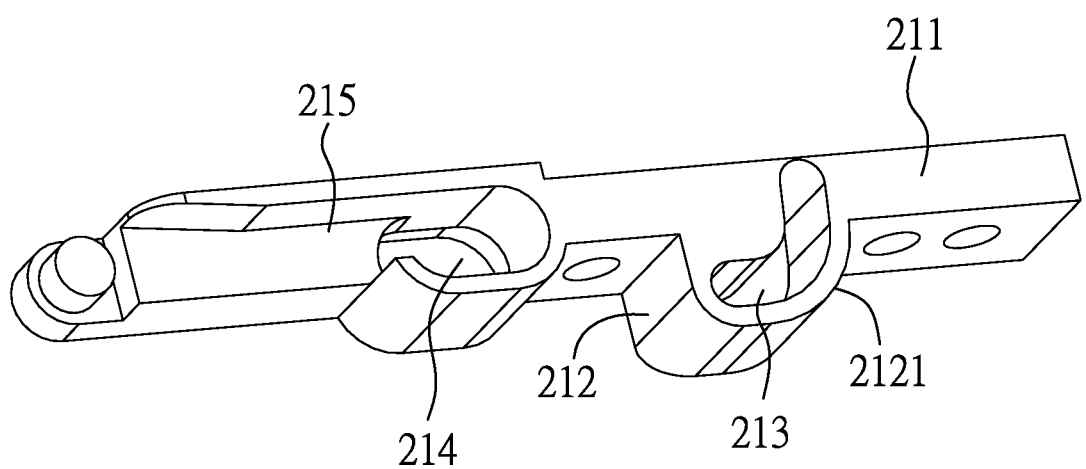
Figure 7:
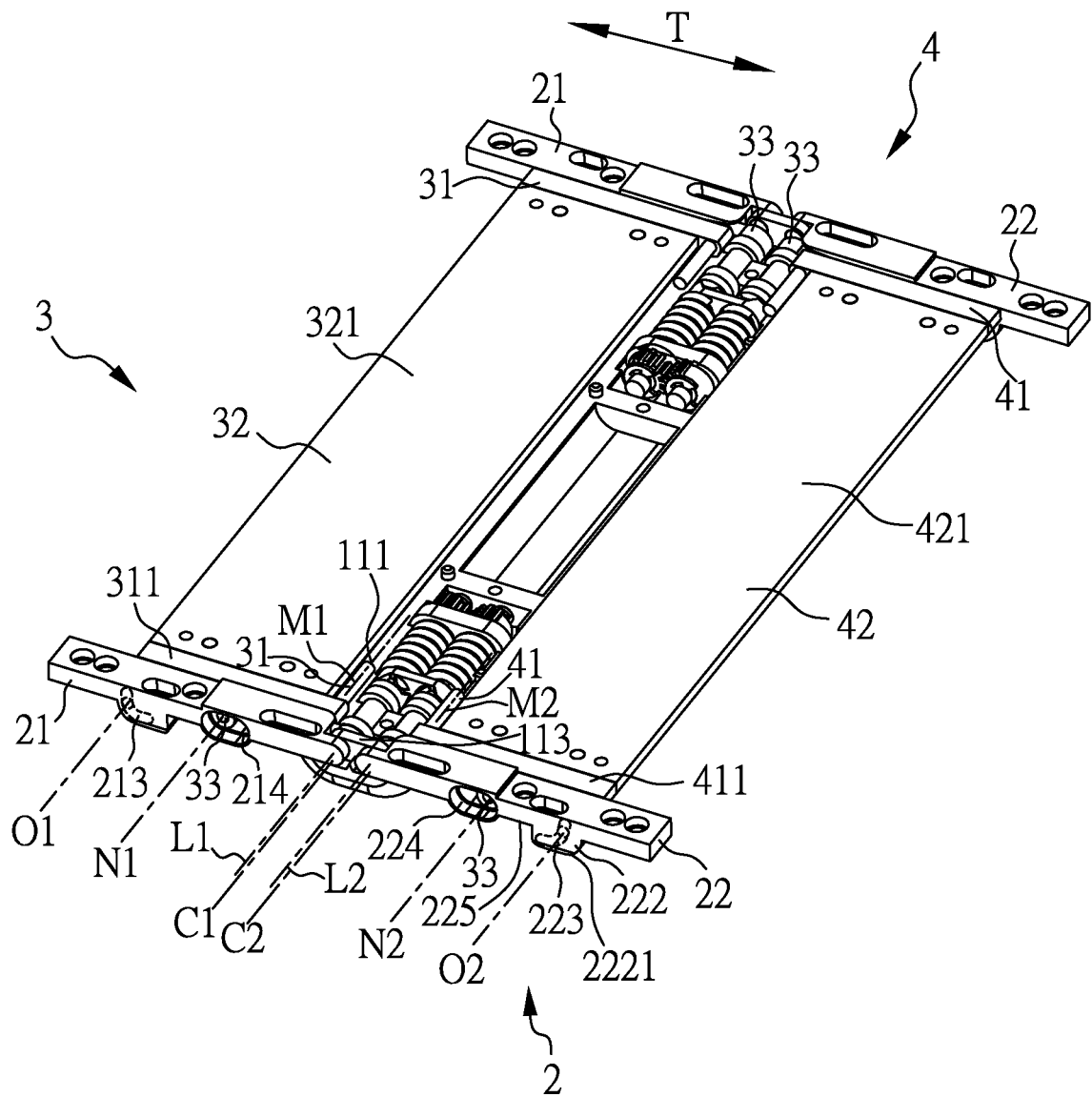
FIG. 7 is an assembly view of the linkage unit, the first operating mechanism and the second operating mechanism of the foldable electronic device according to the present invention.

Reference is made to FIG. 5, FIG. 6 and FIG. 7, each linkage unit 2 is disposed at each end 111 of the stationary shell 11 respectively, and has a first driving shaft 21 and a second driving shaft 22. The first driving shaft 21 has a first main body 211, a first protruding part 212, a first arc groove 213, a first sliding groove 214 and a first embedding slot 215. The first main body 211 extends along a main longitudinal direction T, and the first protruding part 212 is disposed on the first main body 211 and has a first protruding surface 2121. The first arc groove 213 extends from the first main body 211 to the first protruding part 212. The first embedding slot 215 and the first sliding groove 214 are respectively formed on the first main body 211, and the first embedding slot 215 communicates with the first sliding groove 214. The second driving shaft 22 is symmetrical to the first driving shaft 21, and has a second main body 221, a second protruding part 222, a second arc groove 223, a second sliding groove 224 and a second embedding slot 225. The second main body 221 also extends along the main longitudinal direction T. The second protruding part 222 is disposed on the second main body 221 and has a second protruding surface 2221. The second arc groove 223 extends from the second main body 221 to the second protruding part 222. The second embedding slot 225 and the second sliding groove 224 are respectively formed on the second main body 221, and the second embedding slot 225 communicates with the second sliding groove 224. The first driving shaft 21 is pivotally connected to the stationary shell 11 on the first rotating axis L1. The second driving shaft 22 is pivotally connected to the extending plate 113 of the stationary shell 11 on the second rotating axis L2.

Figure 8:
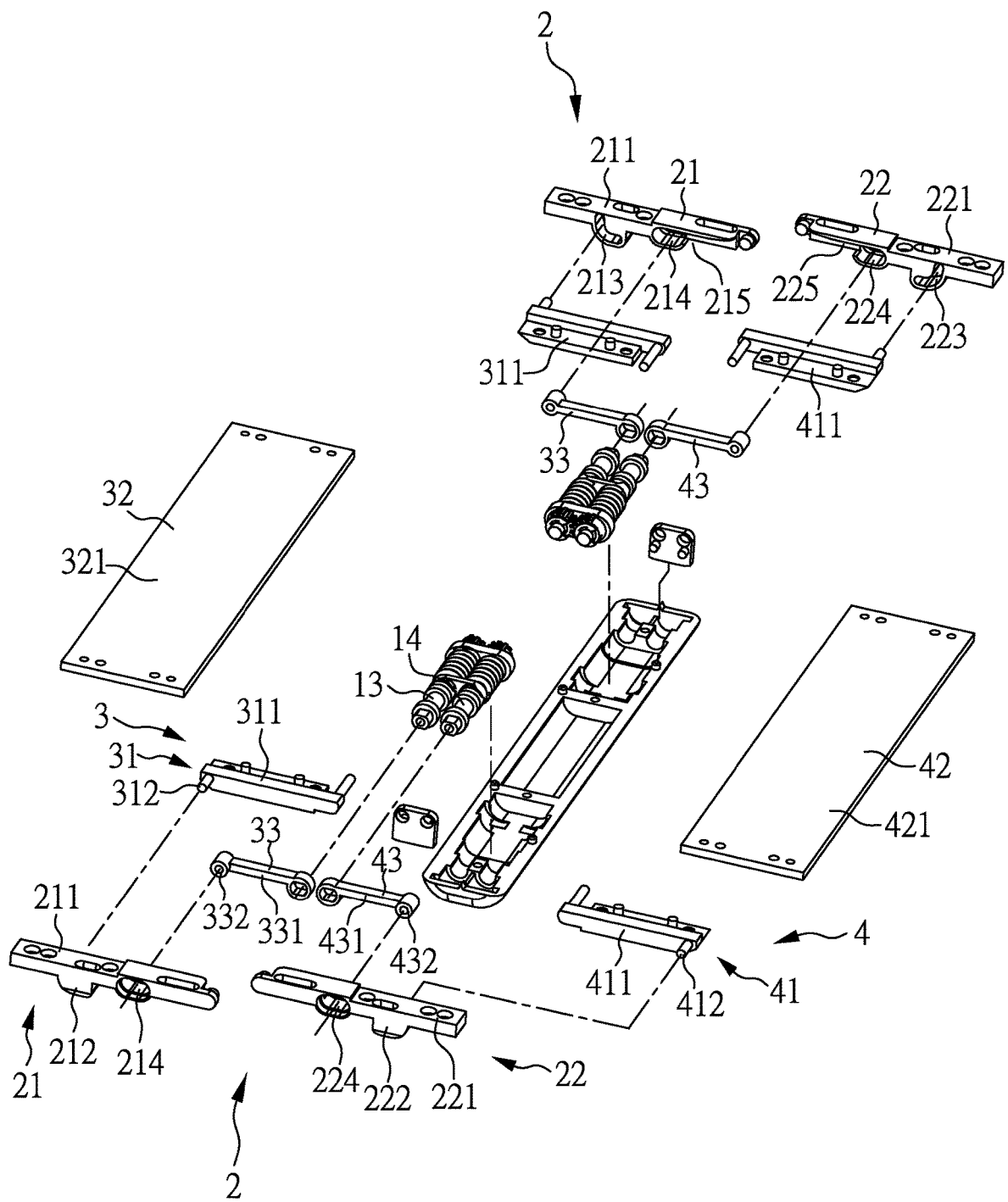
FIG. 8 is an explosive view of the linkage unit, the first operating mechanism and the second operating mechanism of the foldable electronic device according to the present invention.
Figure 9:
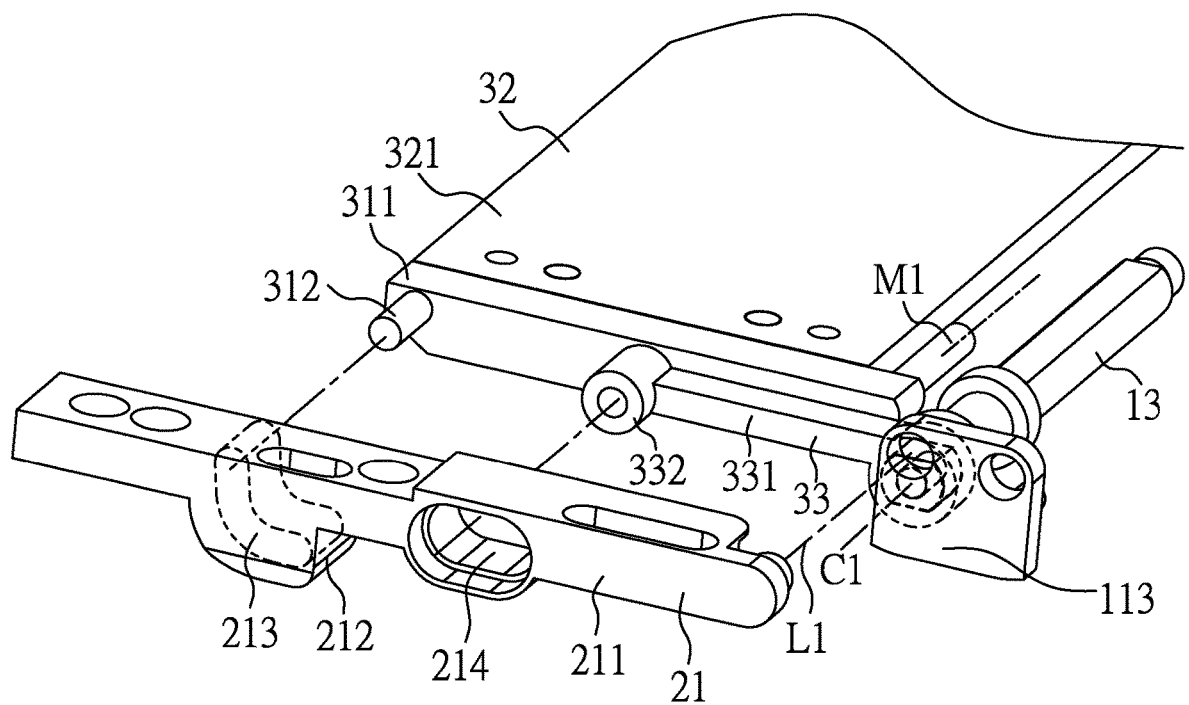
FIG. 9 is a partial explosive view of the linkage unit and the first operating mechanism of the foldable electronic device according to the present invention.

Reference is made to FIG. 7, FIG. 8 and FIG. 9, the first operating mechanism 3 has two first wing rods 31, a first lifting plate 32 and two first connecting rods 33. Each of the first wing rods 31 has a first supporting surface 311 and a first protruding end 312, and is pivotally connected to each first driving shaft 21 and each end 111 of the stationary shell 11 on a first pivoting axis M1. Thereby, each of the first protruding ends 312 is slidably disposed in the first arc groove 213 on the first subordinate connecting axis O1. The first lifting plate 32 is fixed between the first wing rods 31 and has a first lifting surface 321 substantially contacting with the first supporting surface 311 in parallel. Each of the first connecting rods 33 is fixed to each of the first shafts 13 correspondingly, and is pivotally connected to the first driving shaft 21 on a first connecting axis N1. Each of the first connecting rods 33 has a first rod body 331 and a first rod end 332. The first rod body 331 is connected to the first rod end 332. When first rod end 332 is slidably disposed in the first sliding groove 214, the first rod body 331 is located in the first embedding slot 215 correspondingly.

Similarly, the second operating mechanism 4 has two second wing rods 41, a second lifting plate 42 and two first connecting rods 43. Each of the second wing rods 41 has a second supporting surface 411 and a second protruding end 412, and each of the second wing rods 41 is pivotally connected to each end 111 of the stationary shell 11 on a second pivoting axis M2, and is pivotally connected to each of the second driving shafts 22. Thereby, each of the second protruding ends 412 is slidably disposed in the second arc groove 223 on the second subordinate connecting axis O2. The second lifting plate 42 is fixed between the second wing rods 41 and has a second lifting surface 421 substantially contacting with the second supporting surface 411 in parallel. Each of the second connecting rods 43 is fixed to each of the second shafts 14 correspondingly, and is pivotally connected to the second driving shaft 22 on a second connecting axis N2. Each of the second connecting rods 43 has a second rod body 431 and a second rod end 432. The second rod body 431 is connected to the second rod end 432. When the second rod end 432 is slidably disposed in the second sliding groove 224, the second rod body 431 is located in the second embedding slot 225 correspondingly.

In this embodiment, the first central axis C1, the second central axis C2, the first rotating axis L1, the second rotating axis L2, the first pivoting axis M1, and the second pivoting axis M2 are not overlapping. Preferably, the first central axis C1, the second central axis C2, the first rotating axis L1, the second rotating axis L2, the first pivoting axis M1, and the second pivoting axis M2 are parallel to each other.

Figure 10:
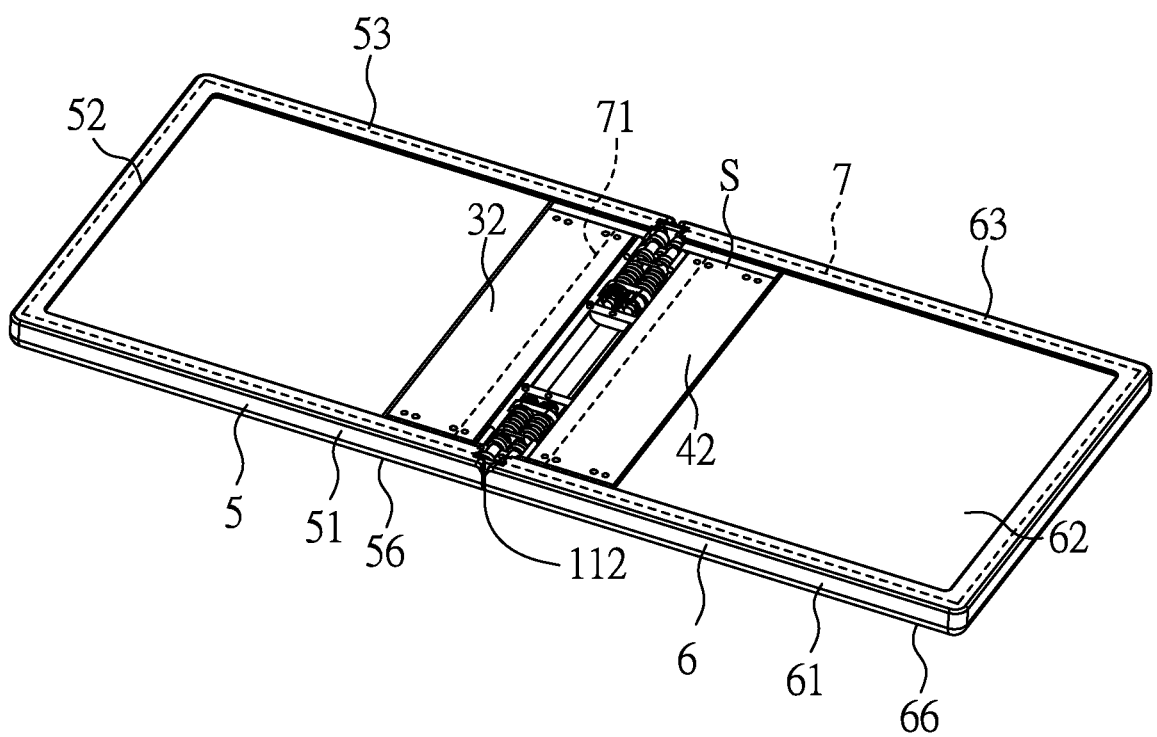
FIG. 10 is a partial three-dimensional schematic view of the foldable electronic device in the unfolded status according to the present invention.
Figure 11:
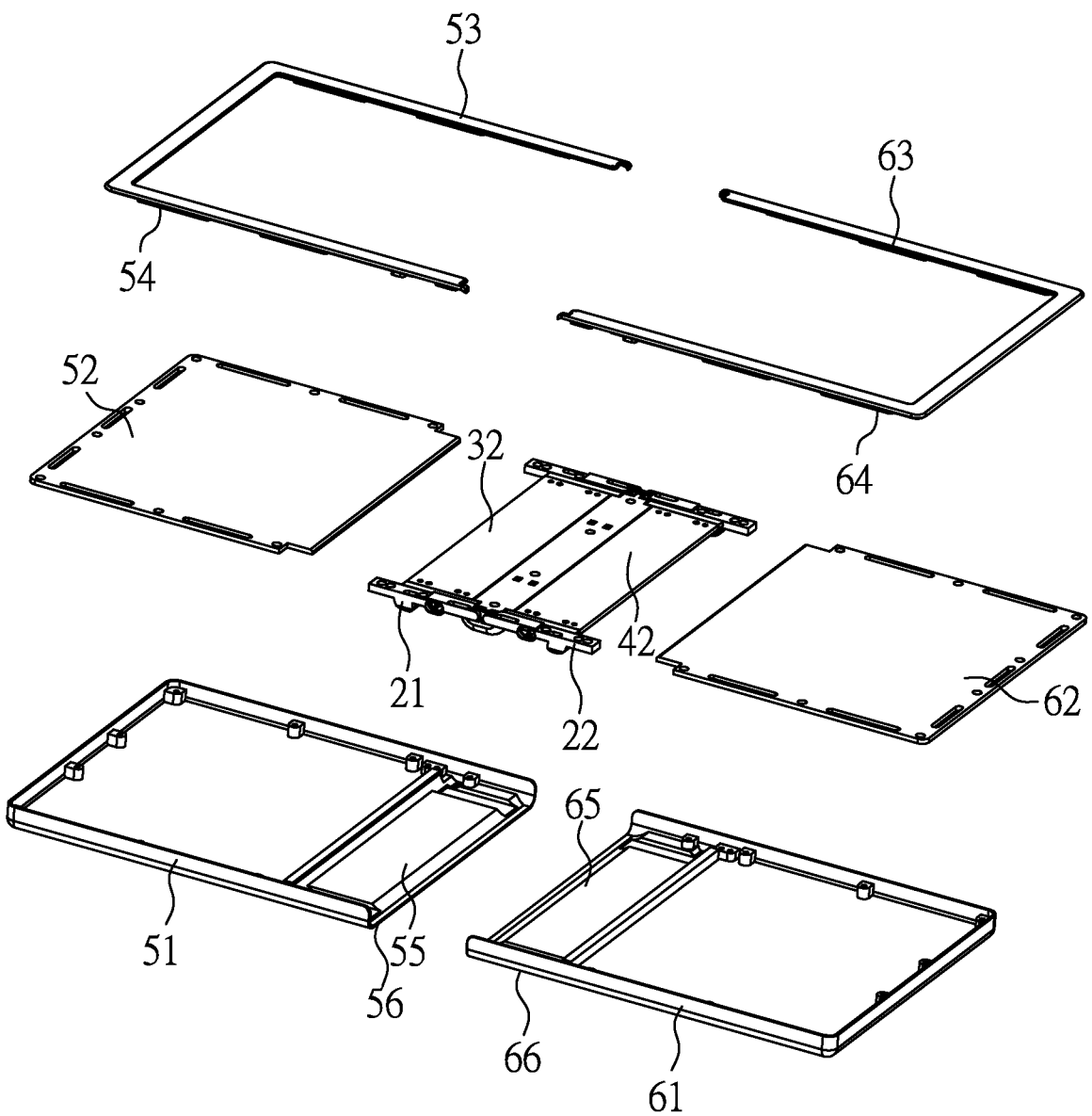
FIG. 11 is a partial explosive view of the first panel body and the second panel body of the foldable electronic device according to the present invention.
Figure 12:
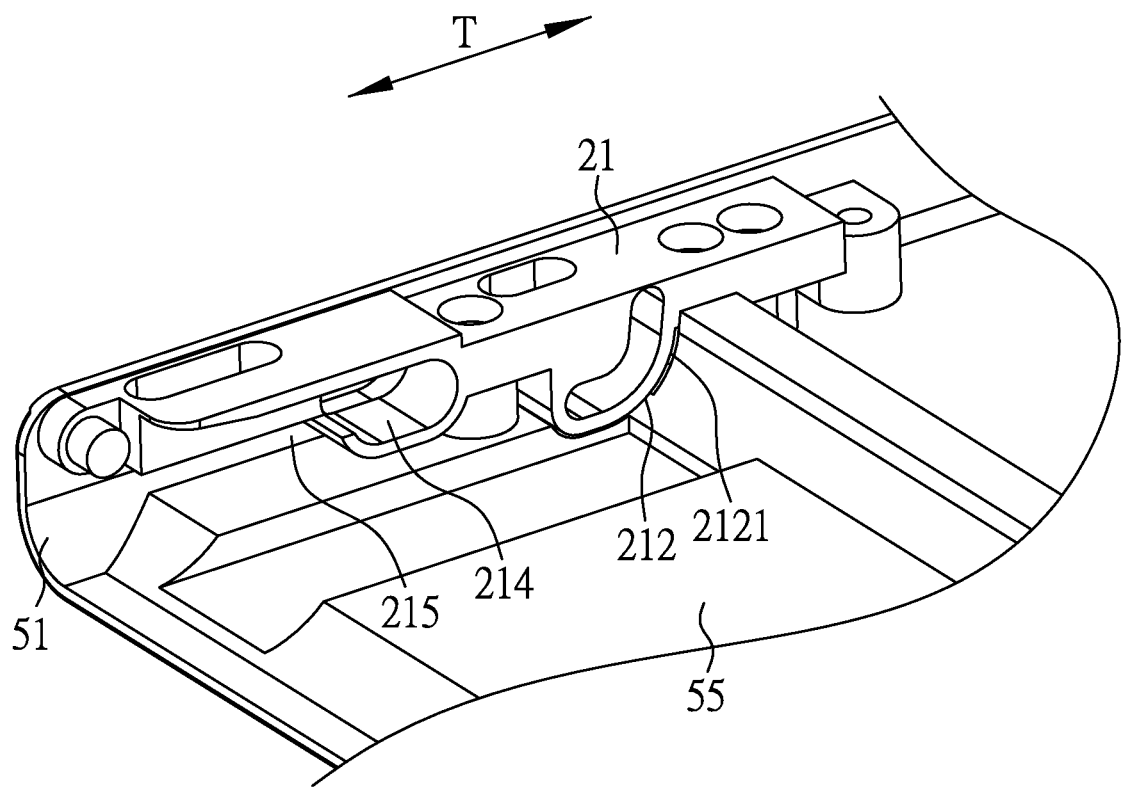
FIG. 12 is an assembly view of the first panel body and the first driving shaft of the foldable electronic device according to the present invention.

Reference is made to FIG. 10, FIG. 11 and FIG. 12, the first panel body 5 includes a first side shell 51, a first support block 52, a first covering plate 53, a plurality of first inserting columns 54, a first inner surface 55 and a first outer surface 56. The first inner surface 55 is opposite to the first outer surface 56. The first driving shaft 21 abuts against and is fixed to the first inner surface 55 and is located in two ends of the first side shell 51 respectively, so that the first panel body 5 can be linked with the first driving shaft 21. The first support block 52 is disposed in the first side shell 51, and the first lifting plate 32 is located between the first support block 52 and the stationary shell 11 and can correspondingly move in the first side shell 51. The first inserting columns 54 are formed on the first covering plate 53 with intervals and roughly in U-shaped, and pass through the flexible screen 7 and the first support block 52 to be fixed to the first side shell 51.

The second panel body 6 includes a second side shell 61, a second support block 62, a second covering plate 63, a plurality of second inserting columns 64, a second inner surface 65 and a second outer surface 66. The second inner surface 65 is opposite to the second outer surface 66. The second driving shaft 22 abuts against and is fixed to the second inner surface 65 and is located in two ends of the second side shell 61 respectively, so that the second panel body 6 can be linked with the second driving shaft 22. The second support block 62 is disposed in the second side shell 61, and the second lifting plate 42 is located between the second support block 62 and the stationary shell 11 and can correspondingly move in the second side shell 61. The second inserting columns 64 are formed on the second covering plate 63 with intervals and roughly in U-shaped, and pass through the flexible screen 7 and the second support block 62 to be fixed to the second side shell 61.

Figure 26:
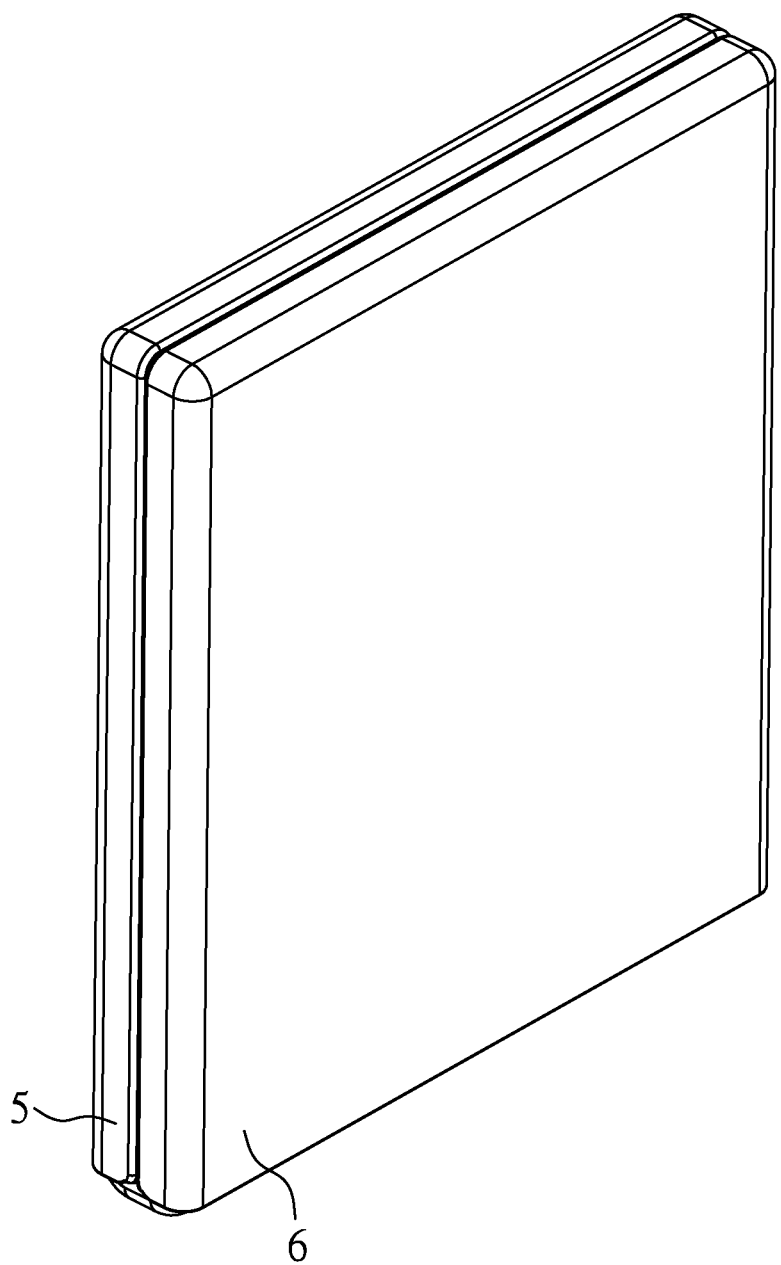
FIG. 26 is a three-dimensional schematic view of the foldable electronic device in folded status according to the present invention.

Through the combination of the first panel body 5, the second panel body 6 and the flexible screen 7, the first covering plate 53, the first side shell 51, the second covering plate 63 and the second side shell 61 can collectively clamp the flexible screen 7, and the first outer surface 56 and the second outer surface 66 are both distant from the flexible screen 7. The first panel body 5 and the second panel body 6 can be transformed between an unfolded state (as shown in FIG. 10) and a folded state (as shown in FIG. 26). The first panel body 5 and the second panel body 6 respectively include electronic components such as circuit boards or connecting wires which are electrically connected to the flexible screen 7, and the relevant details are not described herein.

Figure 28:
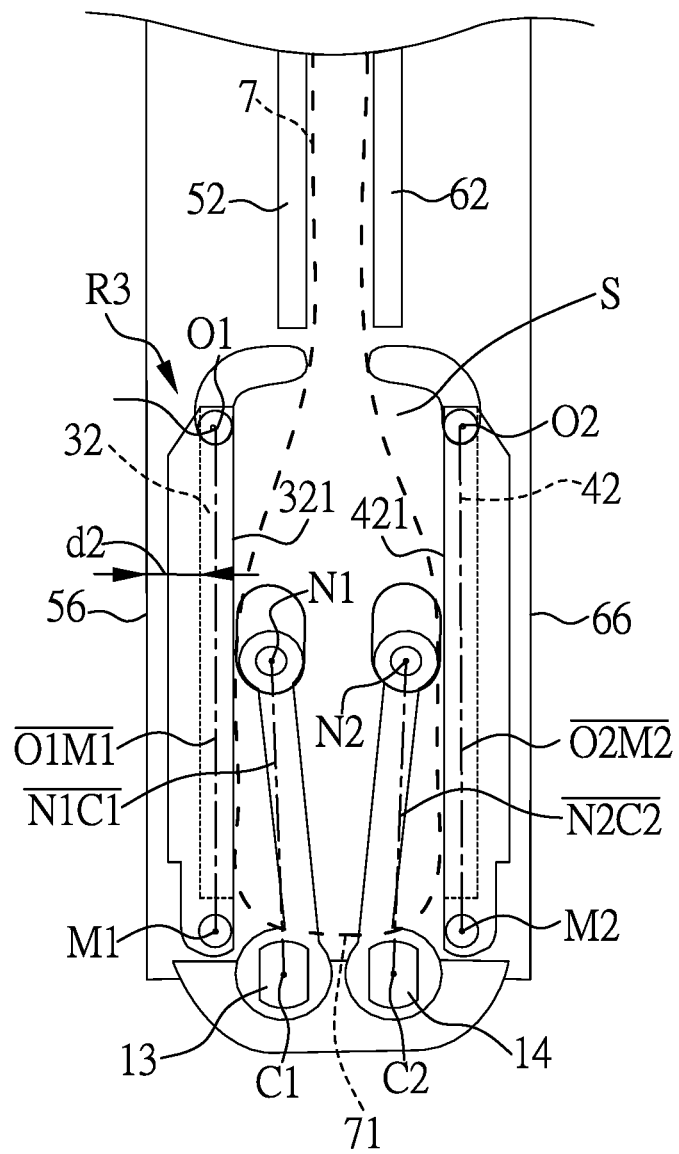
FIG. 28 is a partial side view of the foldable electronic device shown in FIG. 26.
Figure 31:
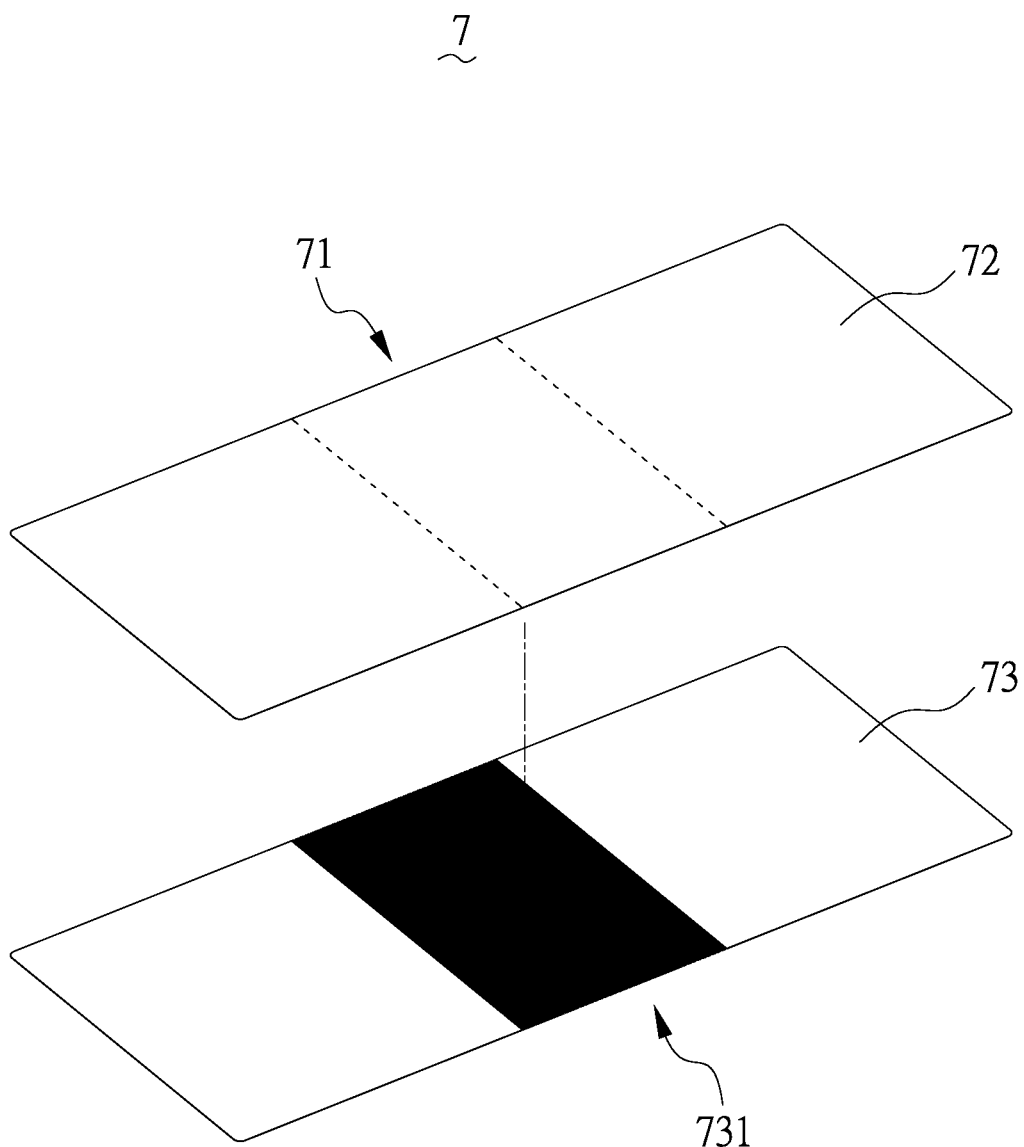
FIG. 31 is an explosive view of the flexible screen of the foldable electronic device according to the present invention.

Referring to FIG. 31, the flexible screen 7 defines a flexible section 71 and includes a multi-layer structure 72 and a supporting plate 73. The multi-layer structure 72 is disposed on the supporting plate 73 and has an OLED layer, at least one protective layer and at least one adhesive layer (not shown in the figures), and the number and arrangement of the aforesaid layers can be adjusted according to the actual practices, and is not limited thereto. In this embodiment, the supporting plate 73 has a weakening structure 731 disposed corresponding to the flexible section 71. Specifically, the supporting plate 73 is disposed at the bottom of the flexible screen 7, and connects to the first panel body 5 and the second panel body 6. When the first panel body 5 and the second panel body 6 are in the unfolded status, the flexible section 71 is flattened, and the stationary shell 11, the first lifting plate 32, the first wing rod 31, the second lifting plate 42 and the second wing rod 41 collectively support the flexible section 71. When the first panel body 5 and the second panel body 6 are in the folded status, the flexible section 71 is bent, and the stationary shell 11, the first lifting plate 32 and the second lifting plate 42 collectively define a yielding space S (as shown in FIG. 28), by settlement, for accommodating the flexible section 71.

Figure 32:
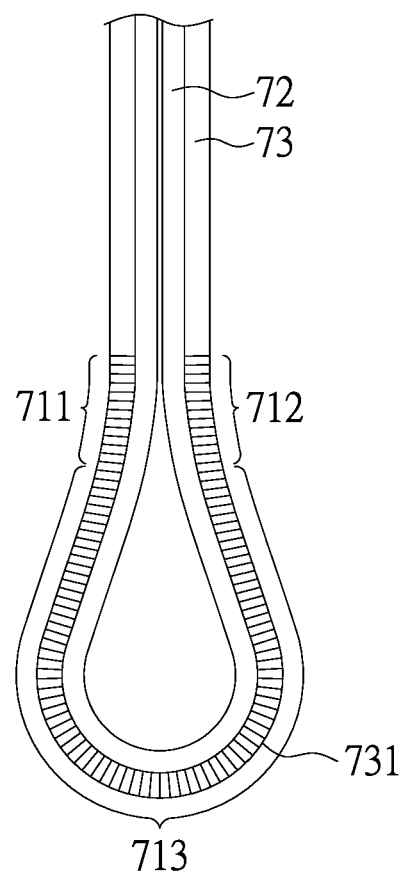
FIG. 32 is a partial side view of the flexible screen of the foldable electronic device in folded status according to the present invention.
Figure 33:
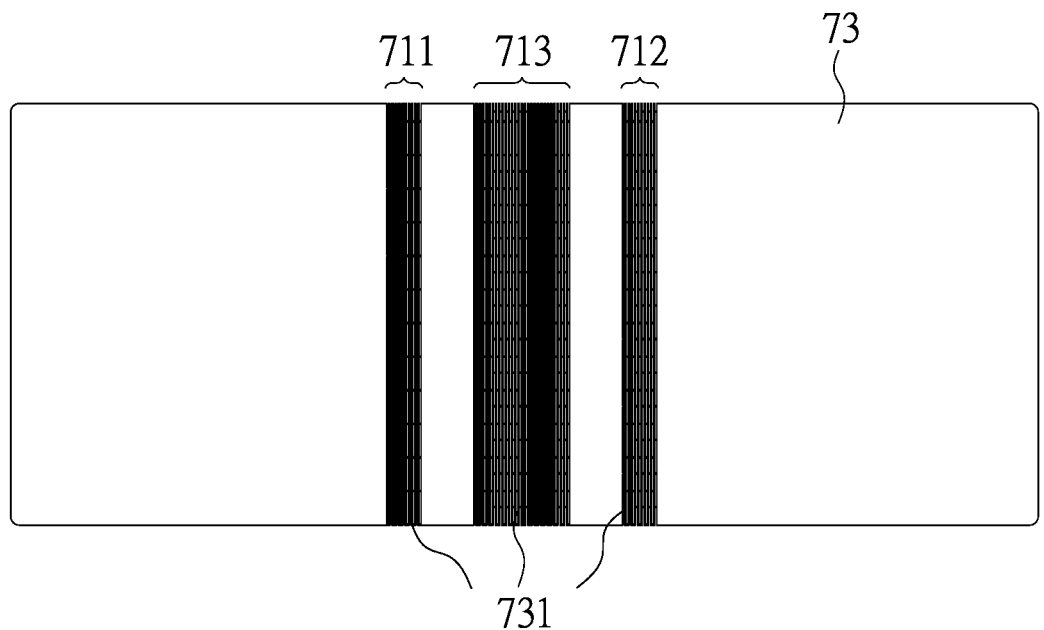
FIG. 33 is a plan view of the supporting plate of the foldable electronic device of another embodiment according to the present invention.

As mentioned above, referring to FIG. 32 and FIG. 1, the flexible section 71 can be distinguished as a first deformation area 711, a second deformation area 712, and a third deformation area 713. The third deformation area 713 is disposed between the first deformation area 711 and the second deformation area 712. The first deformation area 711 corresponds to the first panel body 5, the second deformation area 712 corresponds to the second panel body 6, and the third deformation area 713 corresponds to the central body 1. In this embodiment, the first deformation area 711, the third deformation area 713 and the second deformation area 712 are continuously arranged. In another embodiment, the first deformation area 711, the third deformation area 713, and the second deformation area 712 can be discontinuously arranged and apart from each other (as shown in FIG. 33). The size and position of the intervals between the deformation areas may be adjusted according to actual bending requirements in view of the structural support and flexibility of the flexible section 71, which is not limited thereto.

Figure 34:
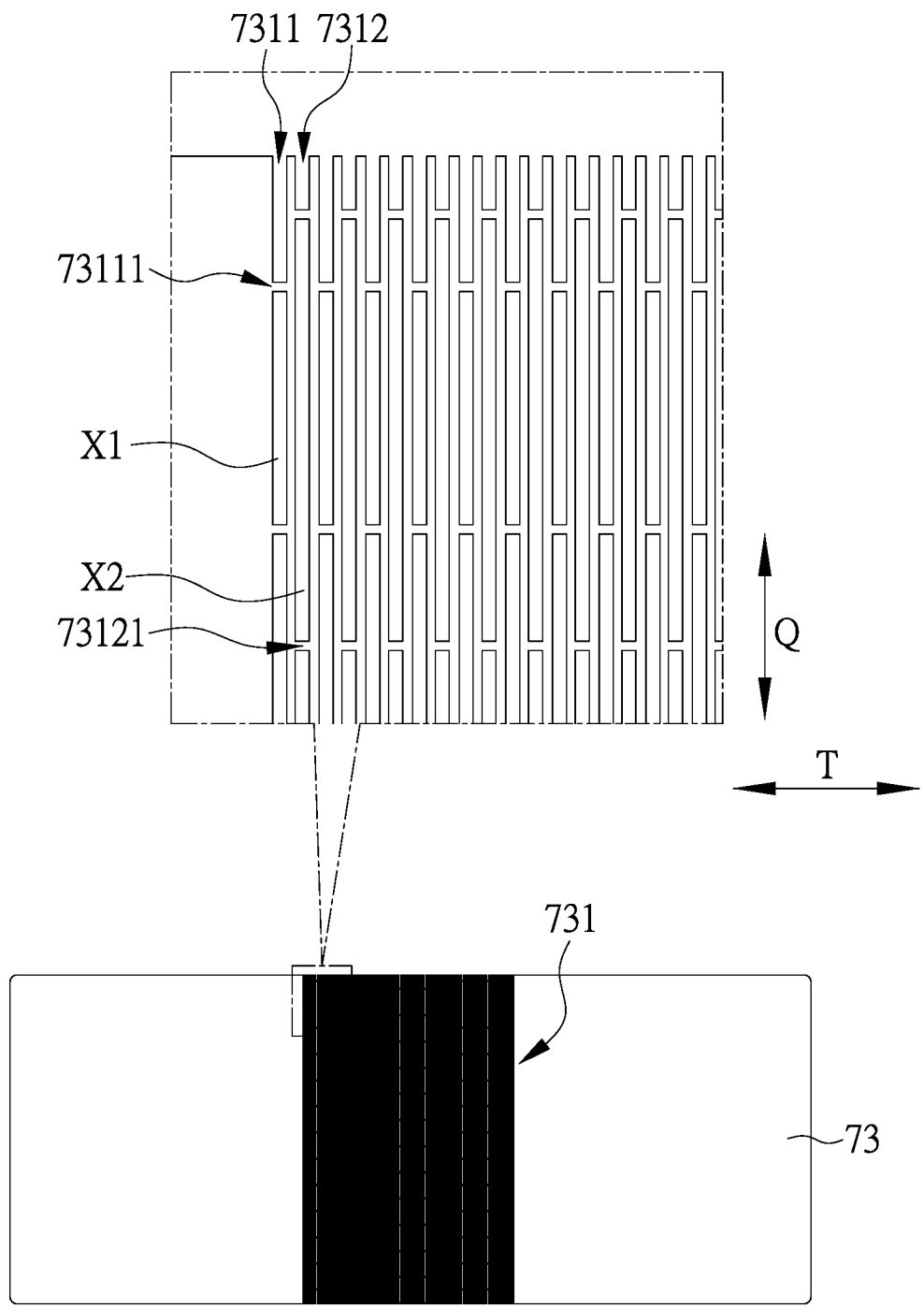
FIG. 34 is a plan view of the supporting plate of the foldable electronic device according to the present invention.

The weakening structure 731 will be illustrated hereinafter. The weakening structure 731 of the present invention is formed by a plurality of parallel grooves in the same direction and arranged alternately with each other. In detail, please referring to FIG. 34, the weakening structure 731 further has a plurality of first groove groups 7311 and a plurality of second groove groups 7312. The first groove groups 7311 and the second groove groups 7312 extend along a first longitudinal direction Q respectively and are alternately arranged with each other in the main longitudinal direction T. In other words, the first groove groups 7311 and the second groove groups 7312 are parallelly arranged in the manner of one following the other. The first longitudinal direction Q is parallel to the first central axis C1 and the second central axis C2, and perpendicular to the main longitudinal direction T. The weakening structure 731 is able to bend in the main longitudinal direction T when the first panel body 5 and the second panel body 6 are transformed from the unfolded status to the folded status. In the meantime, the yielding space S is formed to accommodate the weakening structure 731 of the supporting plate 73. More specifically, in this embodiment, each row of the first groove groups 7311 includes a plurality of first groove portions 73111 sequentially arranged along the first longitudinal direction Q, and each row of the second groove groups 7312 includes a plurality of second groove portions 73121 sequentially arranged along the first longitudinal direction Q. The adjacent first groove portion 73111 and the second groove portion 73121 are staggered from each other. Each of the first groove portions 73111 has a first groove X1, and each of the second groove portions 73121 has a second X2. Specifically, each of the first groove portions 73111 refers to the first groove X1 and the peripheral enclosing and defining the first groove X1, and each of the second groove portions 73121 refers to the second groove X2 and the peripheral enclosing and defining the second groove X2. The first groove X1 and the second groove X2 penetrate through the supporting plate 73 respectively. In other words, the weakening structure 731 is formed by the interconnection of these peripherals. In another embodiment, the first groove X1 and the second groove X2 may not penetrate through the supporting plate 73 as being like a single-sided groove structure formed on the supporting plate 73 on the side adjacent to the first panel body 5 and the second panel body 6. The objective is that the supporting plate 73 can be bent easily as well as bear the bending stress in the first deformation area 711, the second deformation area 712, and the third deformation area 713. The position of the aforementioned single-sided groove structure on the supporting plate 73 may be adjusted according to the bending stress generated when the supporting plate 73 is bent, which is not limited thereto.

More specifically, the width and depth of the first groove X1 and the second groove X2 or the interval between any two adjacent first groove group 7311 and second groove group 7312 can be further adjusted according to the tensile stress or compressive stress generated from bending the supporting plate 73. For example, since the extent of bending on the third deformation area 713 is the largest, the interval of adjacent groove groups can be the densest, and the width of the groove on the third deformation area 713 can be smaller than that on the first deformation area 711 or the second deformation area 712.

Figure 13:
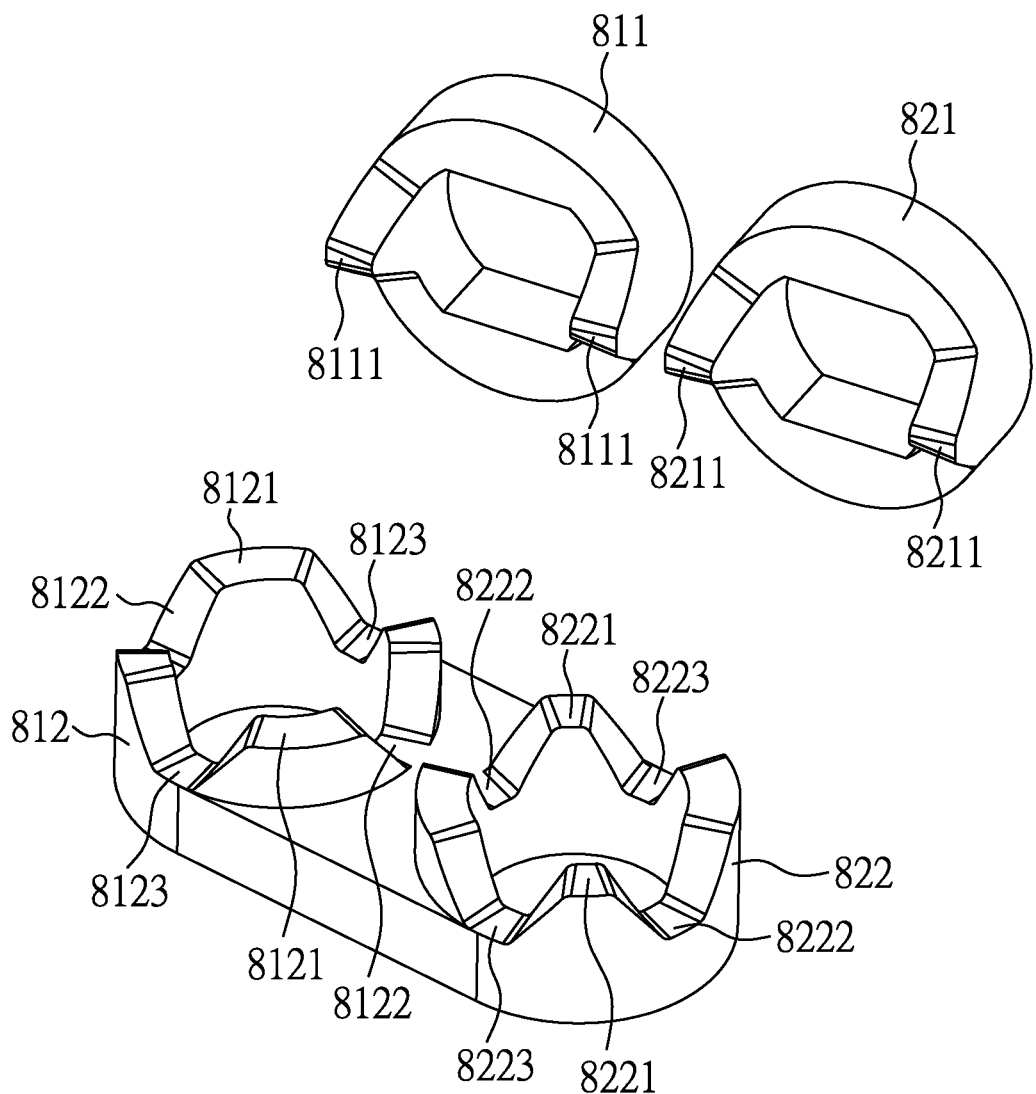
FIG. 13 is a partial explosive view of the first positioning module and the second positioning module of the foldable electronic device according to the present invention.

Referring to FIG. 3, FIG. 4 and FIG. 13, each of the first positioning modules 81 has a first driving cam 811, a first driven cam 812 and a first elastic element 813. The first driving cam 811 is fixed to the first shaft 13 and has two first main-teeth 8111. The first driven cam 812 is slidably sleeved on the first shaft 13 along the first central axis C1 and has two first sub-teeth 8121, two first tooth spaces 8122 and two second tooth spaces 8123. Each of the first sub-teeth 8121 is located between the first tooth space 8122 and the second tooth space 8123. The first elastic element 813 is disposed between the first driven cam 812 and a fixed plate 15. The first driving cam 811 is adapted to rotate with the first shaft 13 about the first central axis C1, and then push the first driven cam 812 to slide on the first shaft 13 to correspondingly compress or release the first elastic element 813.

Each of the second positioning modules 82 has a second driving cam 821, a second driven cam 822 and a second elastic element 823. The driving cam 821 is fixed to the second shaft 14 and has two second main-teeth 8211. The second driven cam 822 is slidably sleeved on the second shaft 14 along the second central axis C2 and has two third tooth spaces 8222, two fourth tooth spaces 8223 and two second sub-teeth 8221. Each of the second sub-teeth 8221 is located between the third tooth space 8222 and the fourth tooth space 8123. The second elastic element 823 is disposed between the second driven cam 822 and the fixed plate 15. The second driving cam 821 is adapted to rotate with the second shaft 14 about the second central axis C2, and then push the second driven cam 822 to slide on the second shaft 14 to correspondingly compress or release the first elastic element 813. In this embodiment, the first driven cam 812 and the second driving cam 821 are formed integrally, but not limited thereto.

Figure 14:
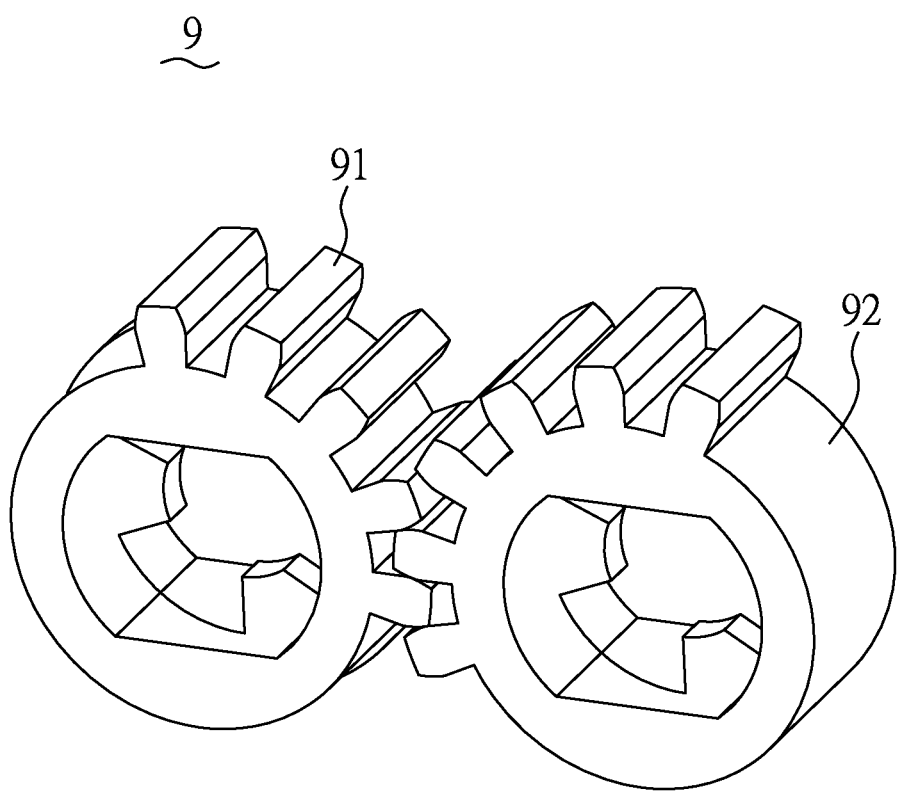
FIG. 14 is a three-dimensional schematic view of the synchronous module of the foldable electronic device according to the present invention.

Reference is made to FIG. 14, each synchronous module 9 has a first gear 91 and a second gear 92. Each first gear 91 is sleeved on each first shaft 13, and each second gear 92 is sleeved on each second shaft 14. Each first gear 91 and each second gears 92 are engaged with each other. In this embodiment, the first gear 91 and the second gear 92 partially have teeth respectively, but not limited thereto.

Following describes operations of the foldable electronic device 1000. When an external force is applied to the first panel body 5, the second panel body 6 is correspondingly linked and can be transformed between the unfolded state (as shown in FIG. 1 and FIG. 10) and the folded state (as shown in FIG. 26).

Figure 15:
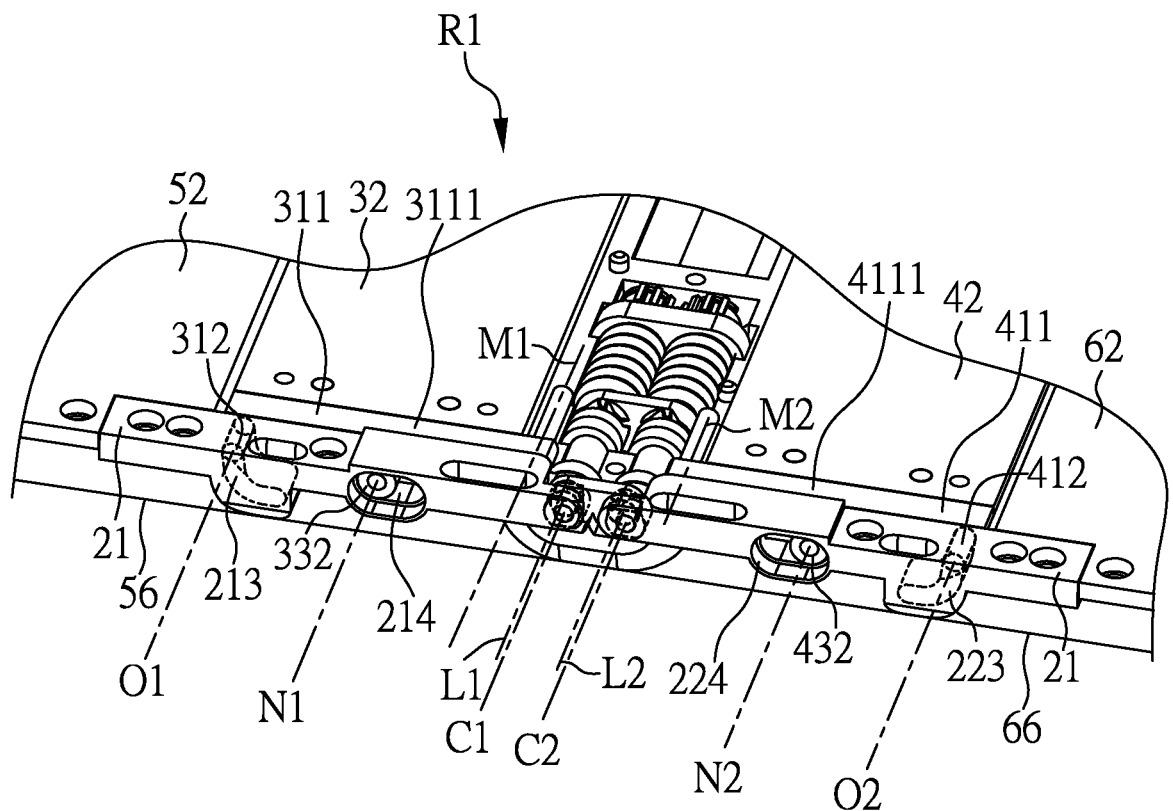
FIG. 15 is a partial three-dimensional schematic view of the foldable electronic device shown in FIG. 10.
Figure 16:
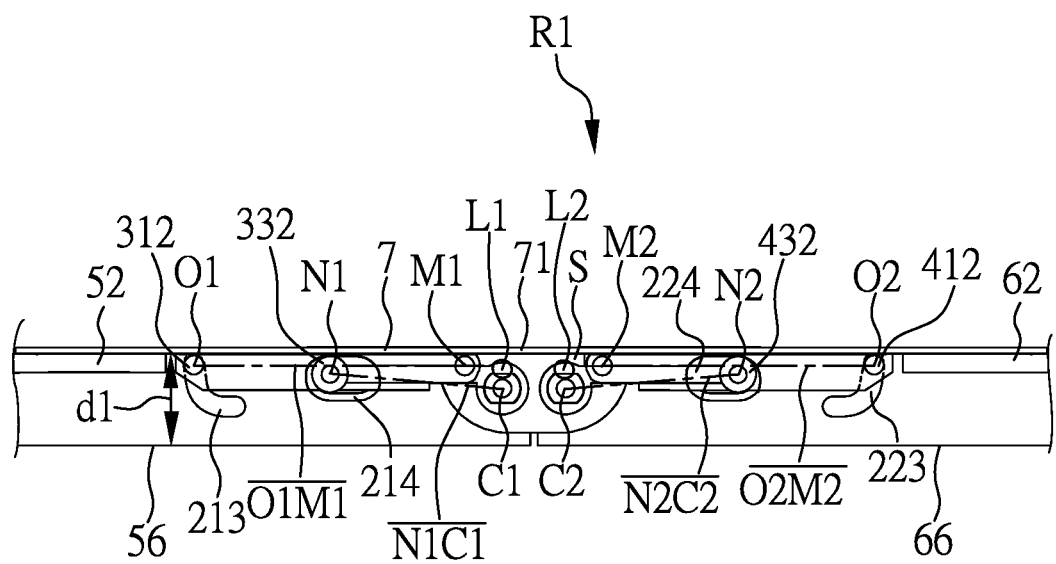
FIG. 16 is a partial three-dimensional side view of the foldable electronic device shown in FIG. 10.
Figure 17:
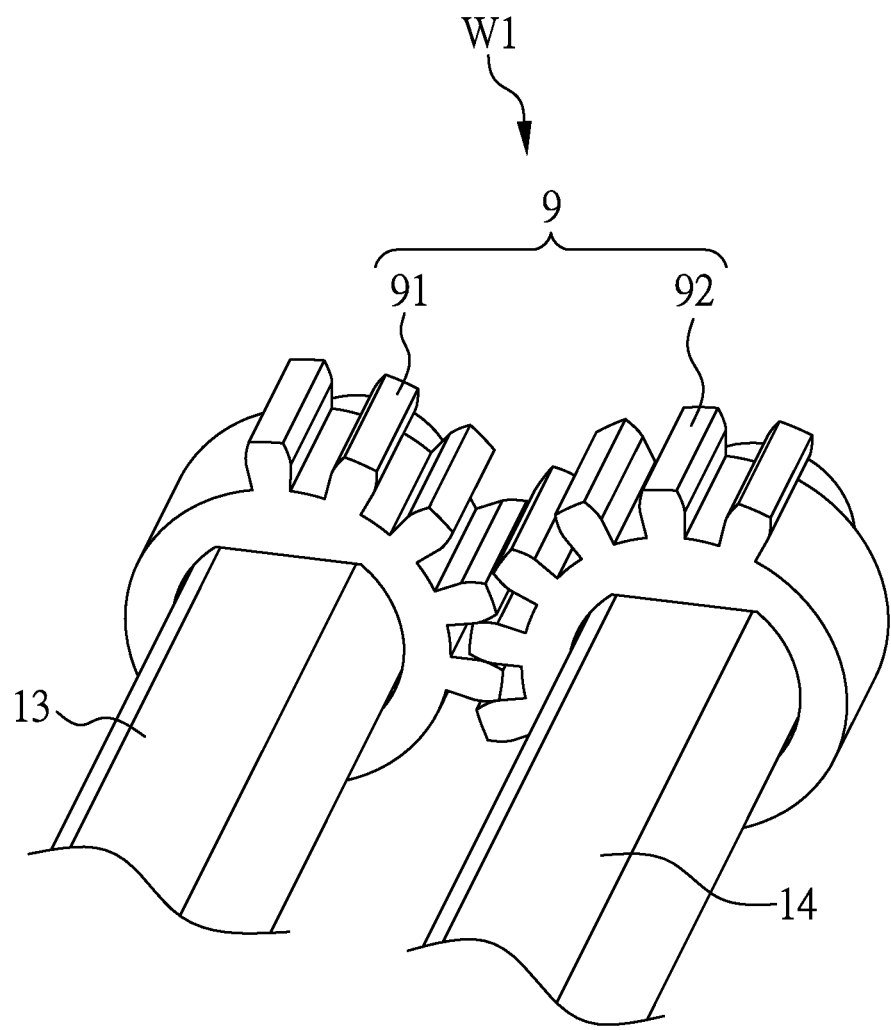
FIG. 17 is a three-dimensional schematic view of the synchronous module of the foldable electronic device shown in FIG. 10.
Figure 18:
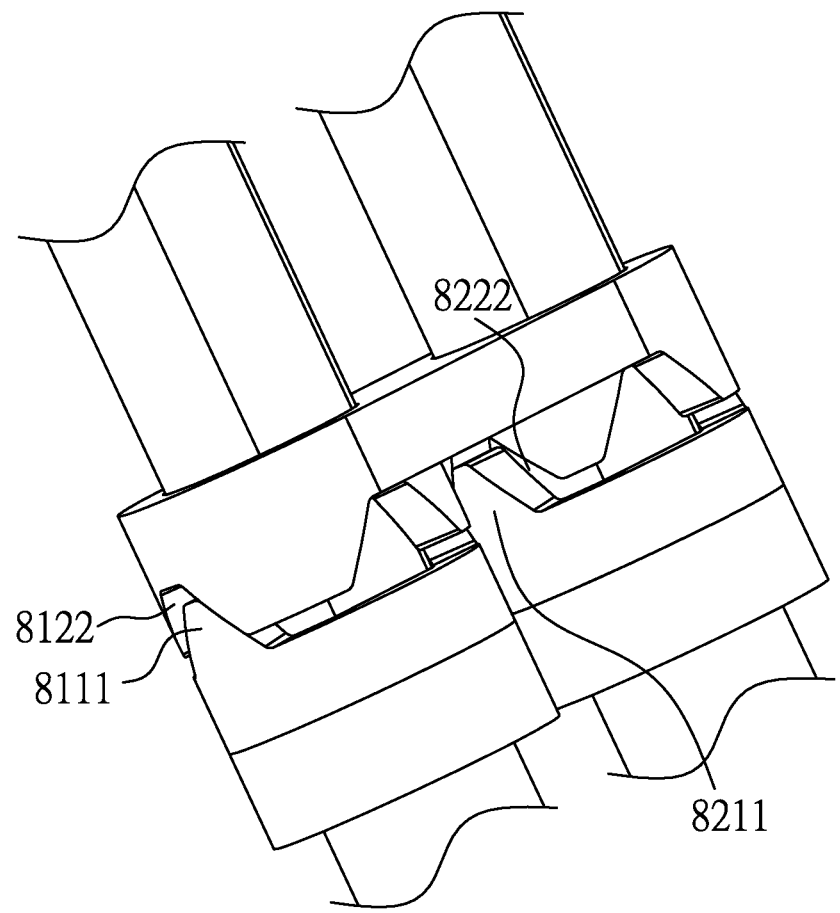
FIG. 18 is a three-dimensional schematic view of the first positioning module and the second positioning module of the foldable electronic device shown in FIG. 10.

Please refer to FIG. 10, FIG. 15 and FIG. 16, when the first panel body 5 and the second panel body 6 are in the unfolded status, the first outer surface 56 and the second outer surface 66 are substantially coplanar. A perpendicular line segment O1M1 between the first subordinate connecting axis O1 and the first pivoting axis M1 is more distant from the first outer surface 56 than a perpendicular line segment N1C1 between the first connecting axis N1 and the first central axis C1. A perpendicular line segment O2M2 between the second subordinate connecting axis O2 and the second pivoting axis M2 is more distant from the second outer surface 66 than a perpendicular line segment N2C2 between the second connecting axis N2 and the second central axis C2. In other words, the first lifting plate 32 and the second lifting plate 42 are respectively in the supporting position R1, and are respectively having a longest perpendicular distance d1 with the first outer surface 56 and the second outer surface 66. In this situation, the flexible screen 7 is flattened, and the first wing rod 31, the first lifting plate 32, the second wing rod 41, the second lifting plate 42 and the stationary shell 11 collectively support the flexible section 71 to provide a stable support, so that the user may touch the flexible section 71, and the image or screen display in the flexible section 71 will not be badly bent. In this unfolded status, the yielding space S (as shown in FIG. 16) defines a minimum volume, and the volume of which almost approaches zero. Also, in this unfolded state, the first protruding end 312 is located at one end of the first arc groove 213 (i.e., the relative upper end shown in FIG. 16), the first rod end 332 is located at one end of the first sliding groove 214, and the second protruding end 412 is located at one end of the second arc groove 223 (i.e., the relative upper end shown in FIG. 16), the second rod end 432 is located at one end of the second sliding groove 224. As shown in FIG. 17 and FIG. 18, the first gear 91 and the second gear 92 are engaged at a first engaging position W1, the first main-teeth 8111 are located in the first tooth space 8122, and the second main-teeth 8211 are located in the third tooth space 8222. In this case, the first elastic element 813 and the second elastic element 823 are in a released state without being compressed.

Following describes operations of each element when the first panel body 5 and the second panel body 6 are transformed from the unfolded status to the folded status. An example is that an external force is applied to the first panel body 5 to rotate relative to the stationary shell 11, the first panel body 5 drives the first driving shaft 21 to rotate about the first rotating axis L1 to make the first protruding end 312 slide in the first arc groove 213, and to make the first rod end 332 slide in the first sliding groove 214, thereby the first wing rod 31 rotates about the first pivoting axis M1, and the first connecting rod 33 rotates about the first central axis C1. When the first connecting rod 33 rotates, the first shaft 13 is also driven to rotate about the first central axis C1, and the first driving cam 811 and the first gear 91 are also driven to rotate. During the rotation of the first driving cam 811, the first main-tooth 8111 of the first driving cam 811 gradually moves away from the first tooth space 8122, so as to push the first driven cam 812 correspondingly, and thus the first elastic element 813 is gradually compressed by the first driven cam 812.

As mentioned above, when the first gear 91 rotates, the second gear 92 rotates synchronously and correspondingly, driving the second shaft 14 to rotate about the second central axis C2, thereby the second connecting rod 43 rotates about the second central axis C2, the second rod end 432 slides in the second sliding groove 224, the second protruding end 412 slides in the second arc groove 223, whereby the second wing rod 41 rotates about the second pivoting axis M2, and the second driving shaft 22 rotates about the second rotating axis L2, and correspondingly drives the second panel body 6 to rotate relative to the stationary shell 11. When the second shaft 14 rotates, the second driving cam 821 gradually moves away from the third tooth space 8222 to push the second driven cam 822 correspondingly, so that the second elastic element 823 is gradually compressed by the second driven cam 822.

Figure 19:
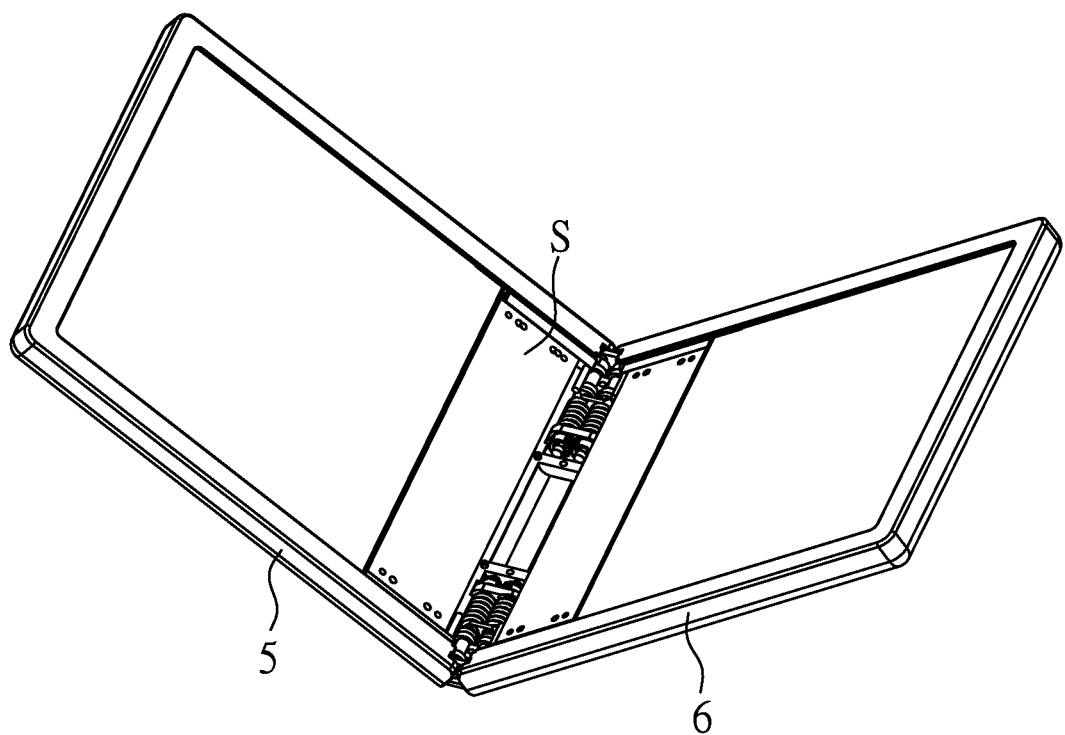
FIG. 19 is a three-dimensional schematic view of the foldable electronic device in half-folded status according to the present invention.
Figure 20:
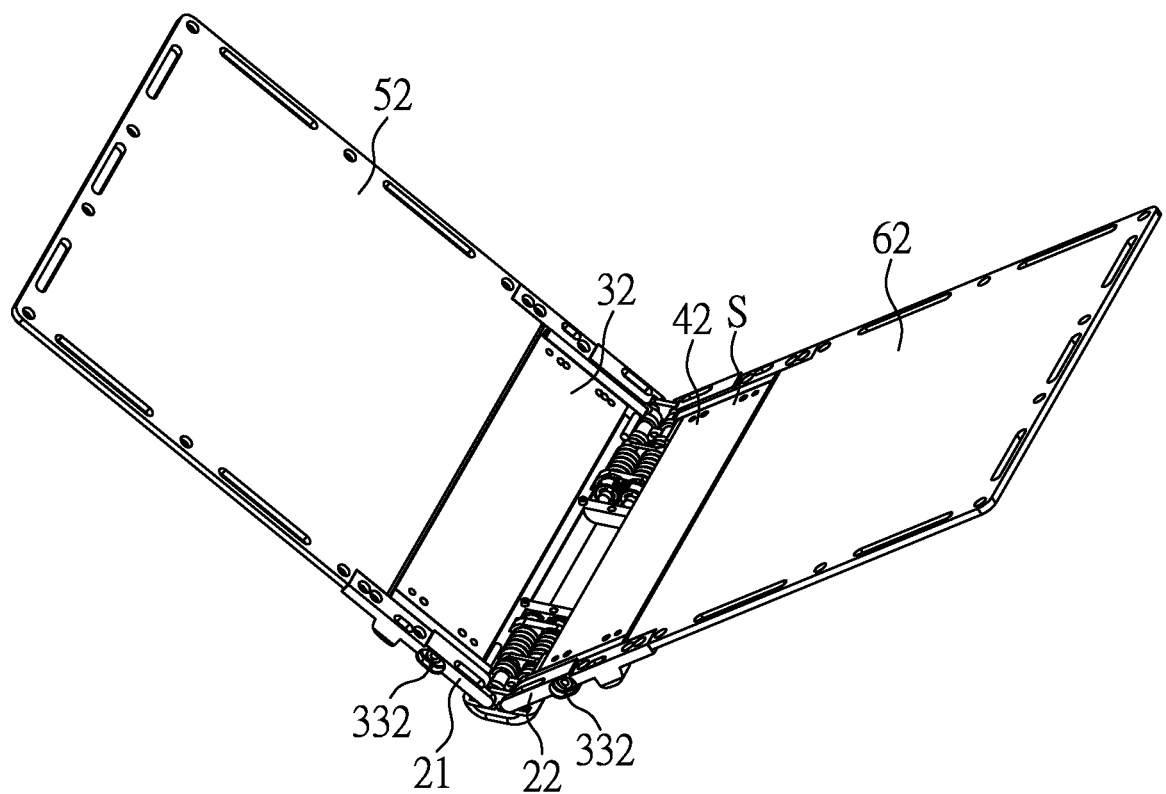
FIG. 20 is a partial three-dimensional schematic view of the foldable electronic device shown in FIG. 19.
Figure 21:
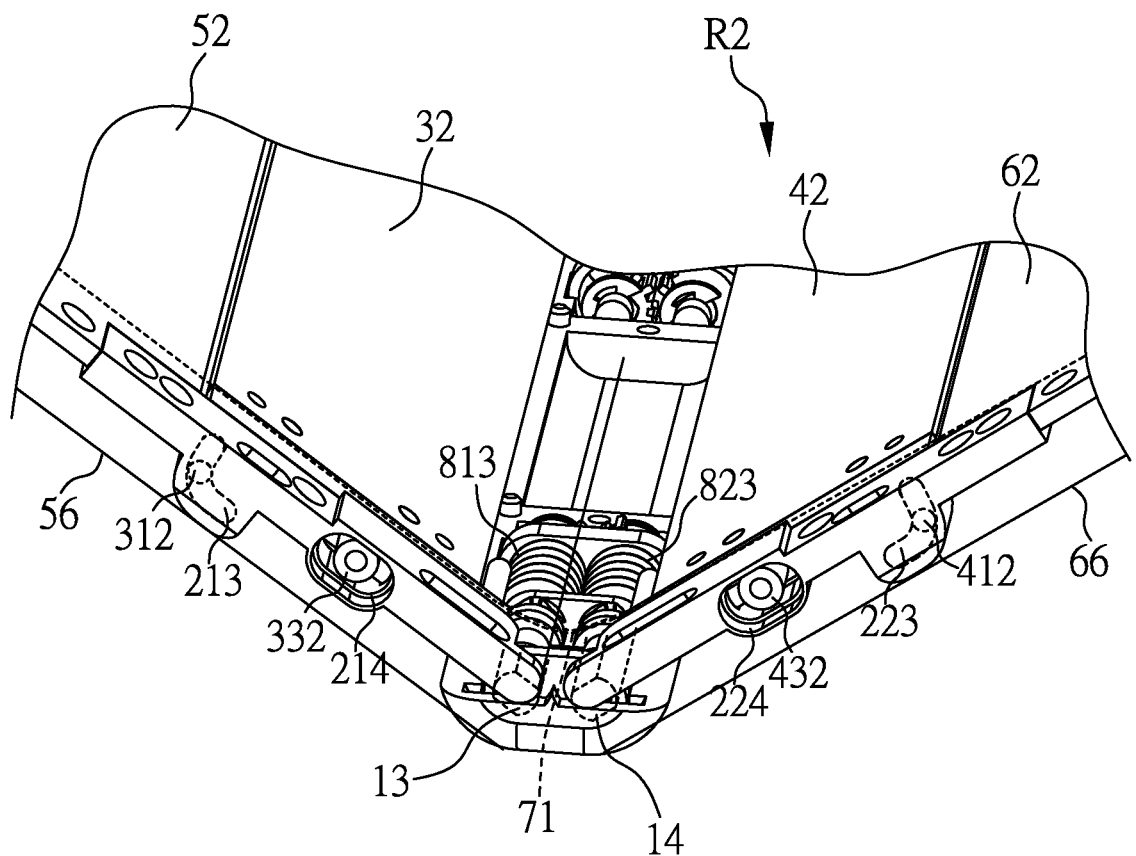
FIG. 21 is another partial three-dimensional schematic view of the foldable electronic device shown in FIG. 19.
Figure 22:
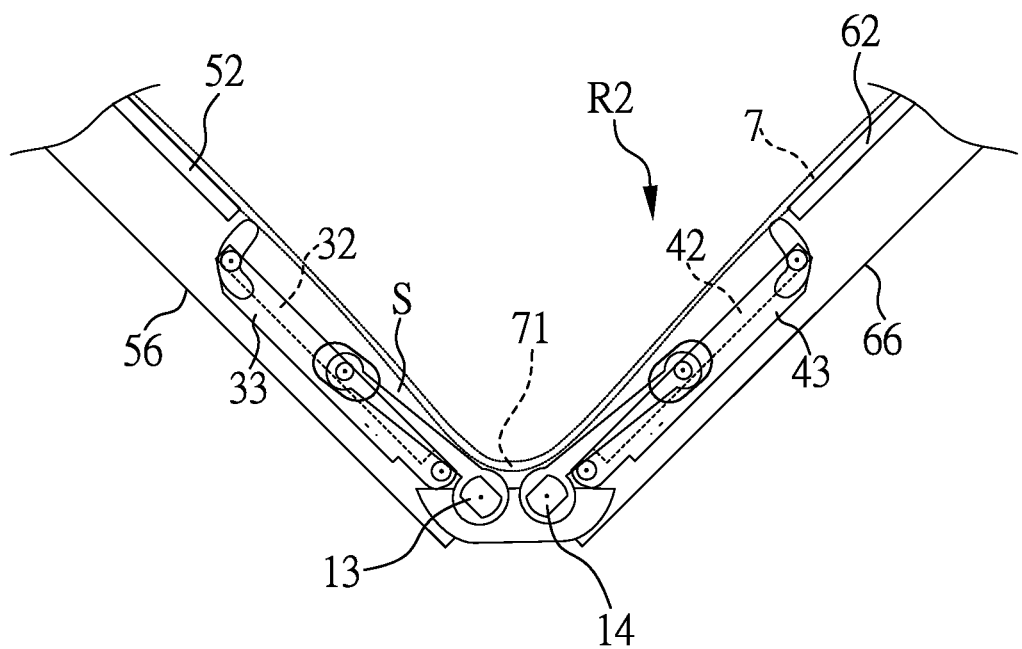
FIG. 22 is a partial side view of the foldable electronic device shown in FIG. 19.
Figure 23:
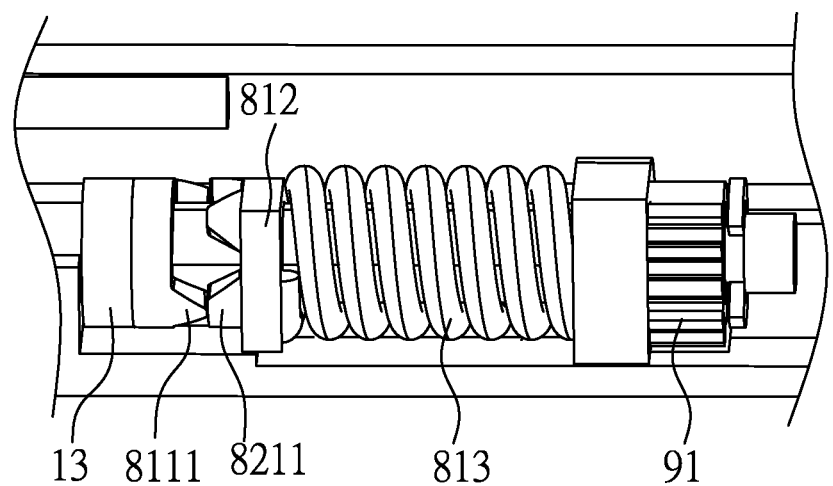
FIG. 23 is a side view of the first positioning module and the synchronous module of the foldable electronic device shown in FIG. 19.
Figure 24:
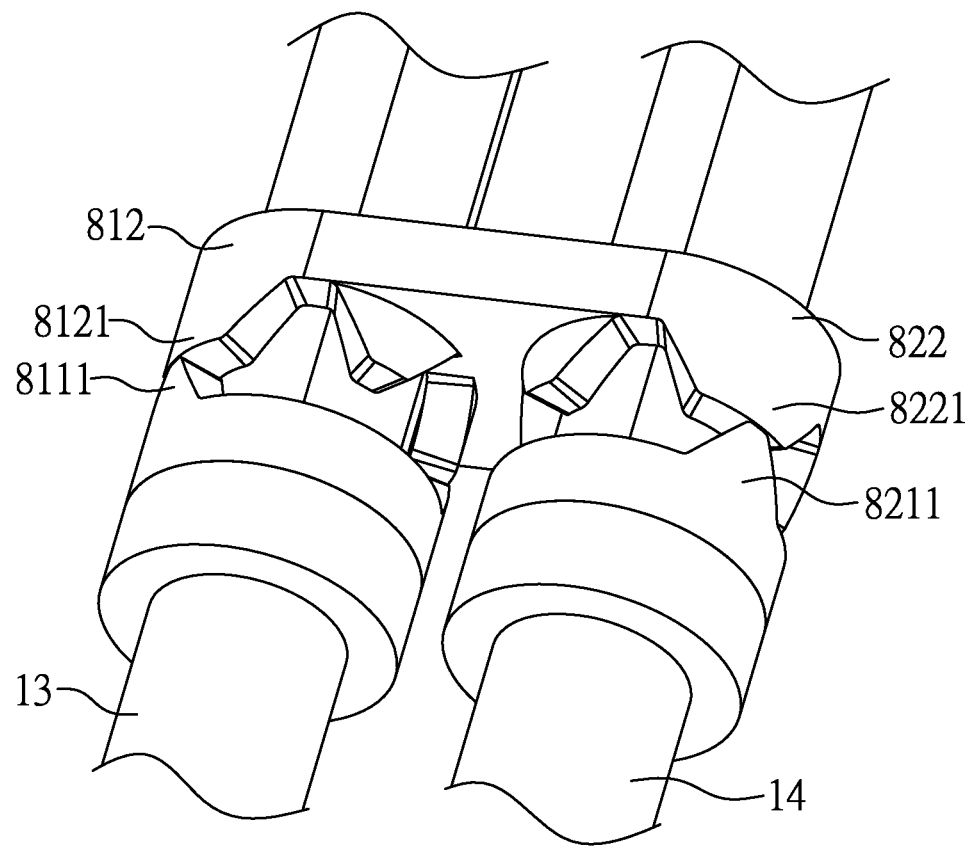
FIG. 24 is a partial three-dimensional schematic view of the first positioning module and the second positioning module of the foldable electronic device shown in FIG. 19.
Figure 25:
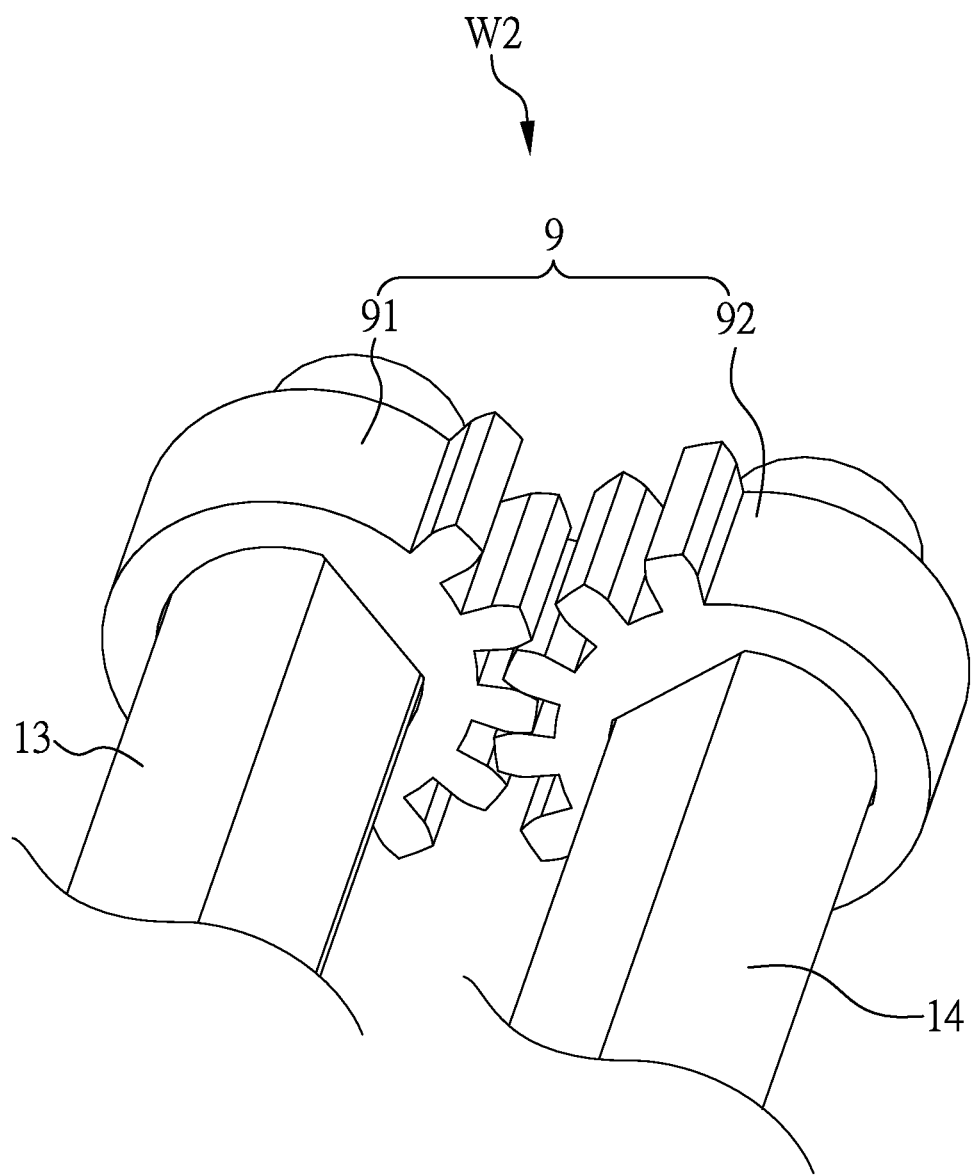
FIG. 25 is a partial three-dimensional schematic view of the synchronous module of the foldable electronic device shown in FIG. 19.

According to above operations, when the first panel body 5 and the second panel body 6 rotate to have an angle of 90 degrees with each other as shown in FIG. 19. Referring to FIG. 20 to FIG. 22, the first protruding end 312 and the second protruding end 412 are in the middle of the first arc groove 213 and the second arc groove 223 respectively, the first rod end 332 and the second rod end 432 are in the middle of the first sliding groove 214 and the second sliding groove 224 respectively, the first main-tooth 8111 and the second main-tooth 8211 abut against the first sub-tooth 8121 and the second sub-tooth 8221 respectively (as shown in FIG. 24), the first elastic element 813 and the second elastic element 823 are compressed by the first driven cam 812 and the second driven cam 822 respectively (as shown in FIG. 23), and the first gear 91 and the second gear 92 rotate to a second engaging position W2 to engage with each other (as shown in FIG. 25). At this time, since the part of the flexible screen 7 disposed on the first panel body 5 and the second panel body 6 is fixed, the flexible section 71 will be slightly bent (see FIG. 22) to avoid improper extrusion or crushing. The first lifting plate 32 and the second lifting plate 42 are located at a transition position R2 and are more adjacent to the first outer surface 56 and the second outer surface 66 respectively, so that the volume of the yielding space S collectively defined by the first wing rod 31, the first lifting plate 32, the second wing rod 41, the second lift plate 42 and the stationary shell 11 increases.

Figure 27:
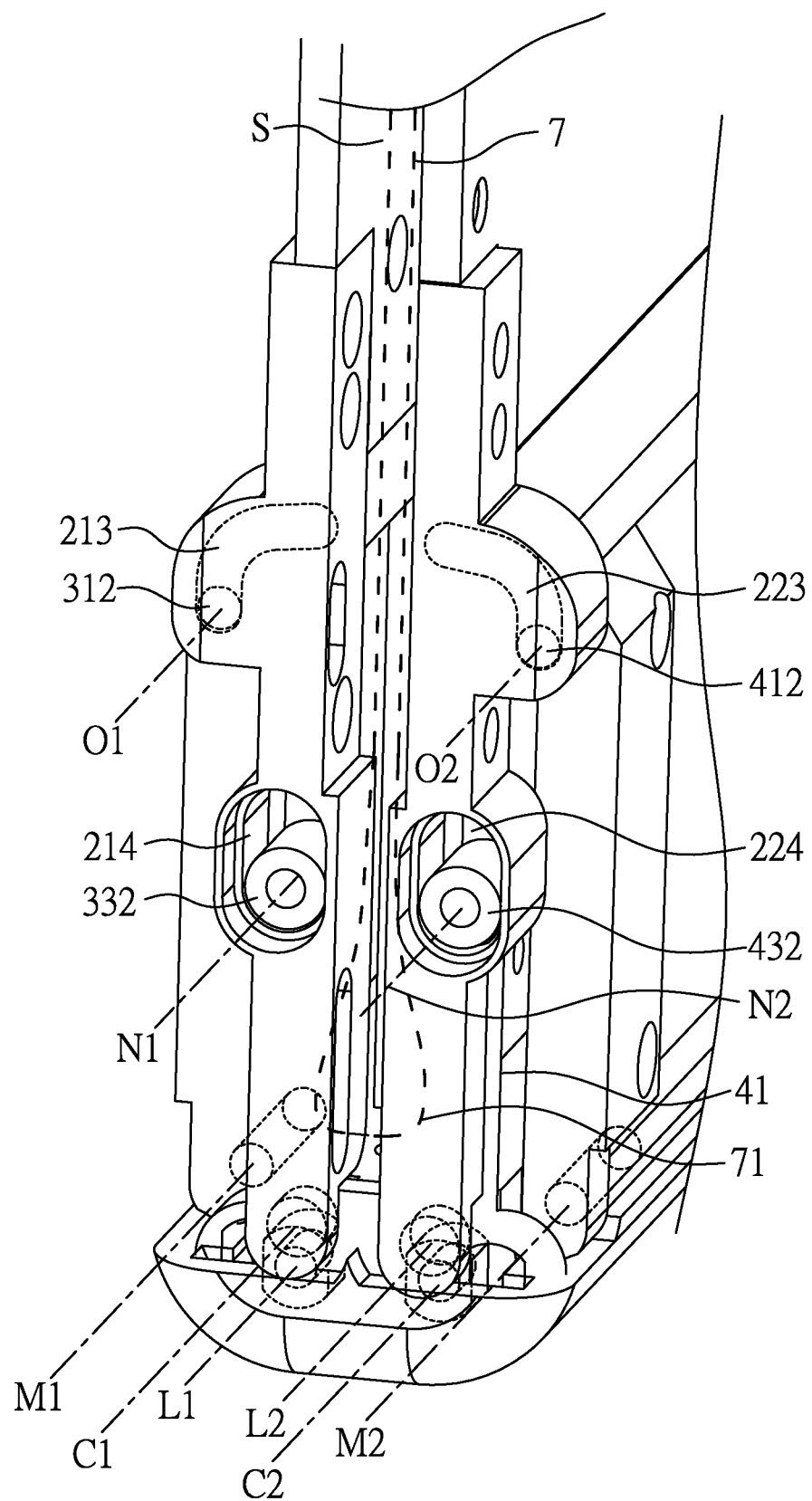
FIG. 27 is a partial three-dimensional schematic view of the foldable electronic device shown in FIG. 26.
Figure 29:
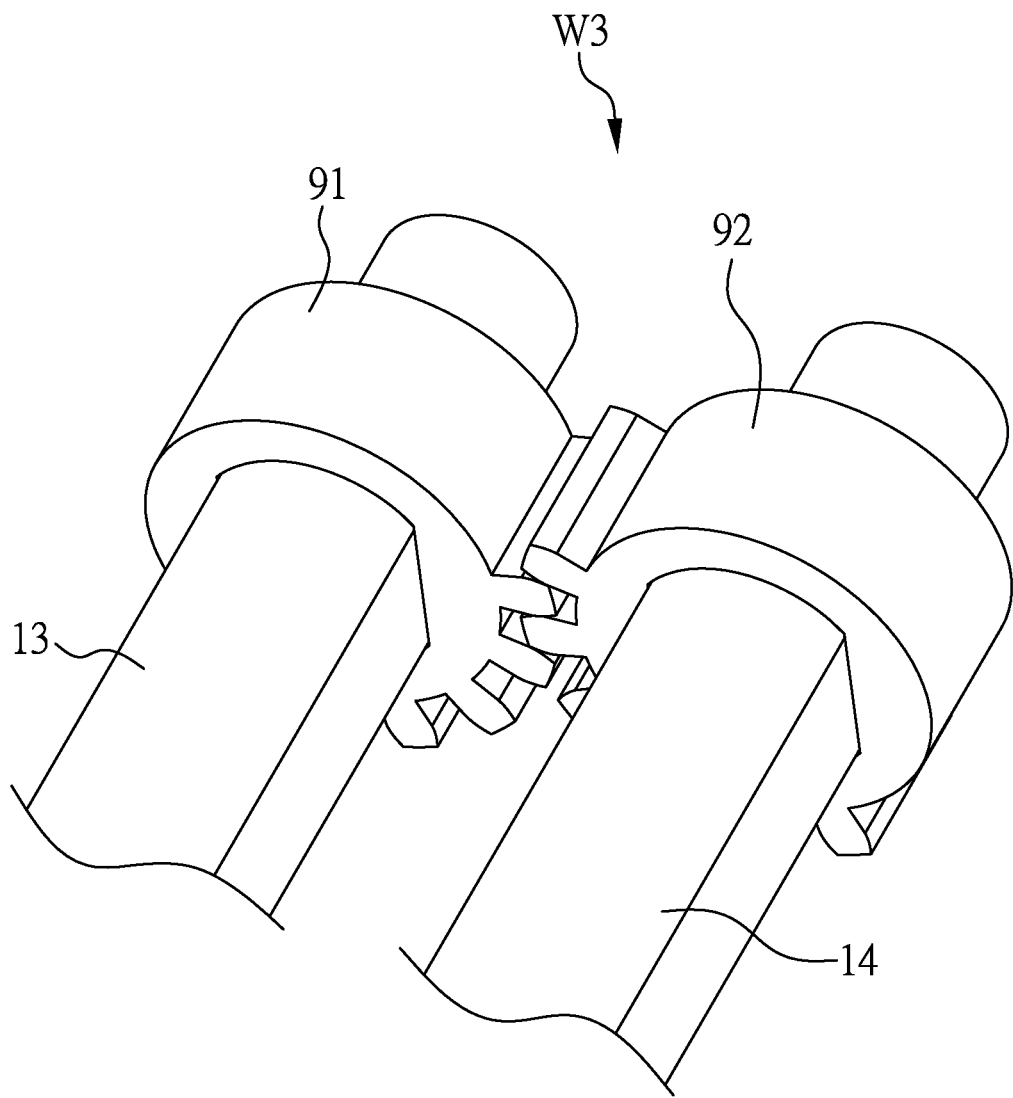
FIG. 29 is a partial three-dimensional schematic view of the synchronous module of the foldable electronic device shown in FIG. 26.
Figure 30:
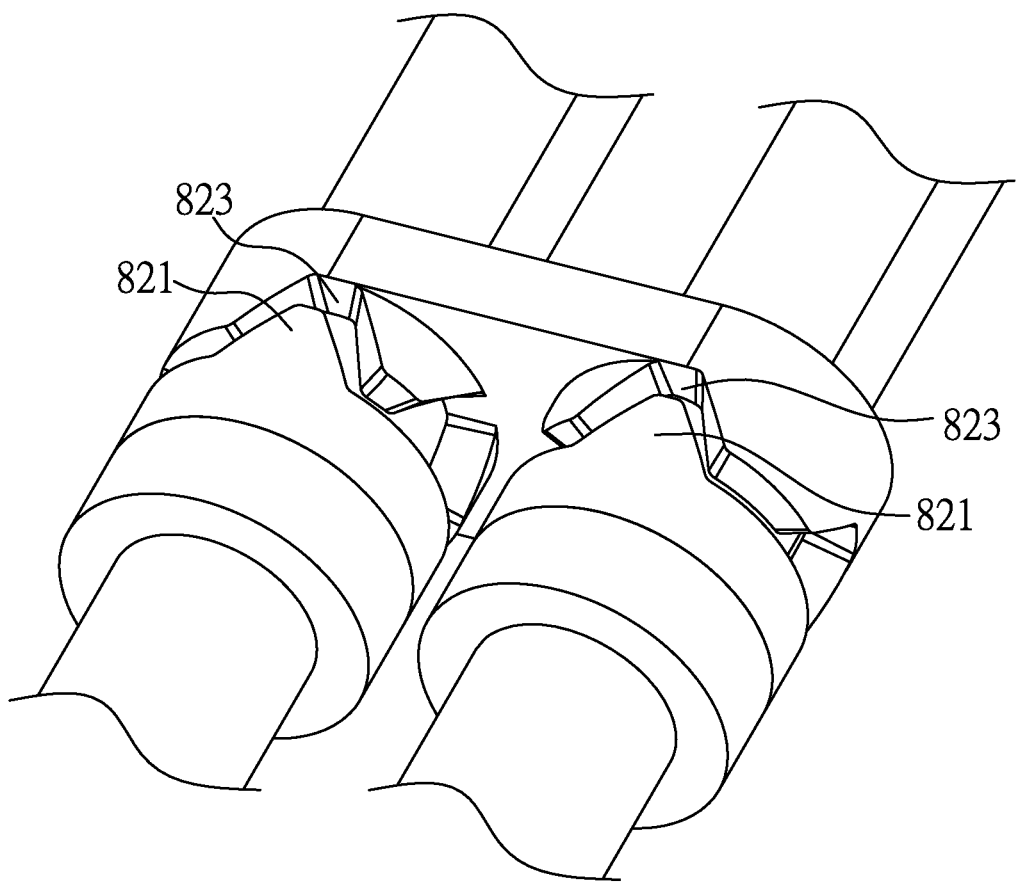
FIG. 30 is a partial three-dimensional schematic view of the first positioning module and the second positioning module of the foldable electronic device shown in FIG. 26.

When the external force is continuously applied to the first panel body 5, the first driving shaft 21 continues to driving the first wing rod 31 and the first connecting rod 33 to rotate, and the first shaft 13 rotates correspondingly to rotate the first gear 91, then the second gear 92 rotate correspondingly, the second shaft 14, the second connecting rod 43, the second wing rod 41, and the second driving shaft 22 continue to rotate correspondingly until the first panel body 5 and the second panel body 6 are in the folded state as shown in FIG. 26 and FIG. 27. Referring to FIG. 28 to FIG. 30, the first lifting surface 321 and the second lifting surface 421 are substantially parallel to each other, and the flexible section 71 is completely bent (with a water drop-shaped cross section). At this time, the first protruding end 312 is located at another end of the first arc groove 213, the first rod end 332 is located at another end of the first sliding groove 214, the second protruding end 412 is located at another end of the second arc groove 223, the second rod end 432 is located at another end of the second sliding groove 224, the first main-tooth 8111 slides to the second tooth space 8123, the second main-tooth 8211 slides to the fourth tooth space 8223, the elastic force of the first elastic element 813 and the second elastic element 823 are released, and the first gear 91 and the second gear 92 are engaged with each other at a third engaging position W3.

As mentioned above, as shown in FIG. 28, the perpendicular line segment O1M1 between the first subordinate connecting axis O1 and the first pivoting axis M1 is more adjacent to the first outer surface 56 than the perpendicular line segment N1C1 between the first connecting axis N1 and the first central axis C1. The perpendicular line segment O2M2 between the second subordinate connecting axis O2 and the second pivoting axis M2 is more adjacent to the second outer surface 66 than the perpendicular line segment N2C2 between the second connecting axis N2 and the second central axis C2. In other words, the first lifting plate 32 and the second lifting plate 42 are respectively in a descending position R3, and are respectively having a shortest perpendicular distance d2 with the first outer surface 56 and the second outer surface 66. In this situation, the stationary shell 11, the first wing rod 31, the first lifting plate 32, the second wing rod 41, and the second lifting plate 42 collectively define the yielding space S which has a maximum volume to accommodate the flexible section 71.

According to the above, the technical feature of the present invention is that through the assembly of the first driving shaft 21, the first wing rod 31 and the first connecting rod 33, and the assembly of the second driving shaft 22, the second wing rod 41 and the second connecting rod 43, the yielding space S defined by the first lifting plate 32, the second lifting plate 42 and the stationary shell 11 changes correspondingly to the bending state of the flexible section 71. As shown in FIG. 10, when the first panel body 5 and the second panel body 6 are in the unfolded state, the flexible section 71 is flattened (i.e., minimum bending degree), so there is no need to save too much space for the flexible section 71. Thus, the yielding space S is correspondingly defined to have minimum volume. As shown in FIG. 26 and FIG. 28, when the first panel body 5 and the second panel body 6 are in the folded state, the flexible section 71 is bent with largest degree, so it is necessary to save biggest space for the flexible section 71. Thus, the yielding space S is correspondingly defined to have maximum volume for accommodating and protecting the flexible section 71. In addition, another feature of the present invention is that the flexible screen 7 has the supporting plate 73 and the weakening structure 731 corresponding to the flexible section 71 to support the flexible screen 7 and bear the bending stress.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims

What is claimed is:

1. A foldable electronic device, comprising:
   a central body comprising a stationary shell, an accommodating space, a first shaft and a second shaft, wherein the stationary shell defines the accommodating space, the first shaft and the second shaft are disposed in the accommodating space, the first shaft extends along a first central axis, and the second shaft extends along a second central axis;
   a linkage unit comprising a first driving shaft and a second driving shaft, wherein the first driving shaft is pivotally connected to the stationary shell on a first rotating axis and has a first sliding groove and a first arc groove, and the second driving shaft is pivotally connected to the fixed shell on a second rotating axis and has a second sliding groove and a second arc groove;
   a first operating mechanism comprising:
      a first wing rod pivotally connecting to the stationary shell on a first pivoting axis and pivotally connecting to the first driving shaft, and having a first supporting surface and a first protruding end being slidably disposed in the first arc groove;
      a first lifting plate being fixed to the first wing rod and having a first lifting surface substantially contacting with the first supporting surface in parallel; and
      a first connecting rod being fixed to the first shaft and pivotally connecting to the first driving shaft, and having a first rod end being slidably disposed in the first sliding groove;
   a second operating mechanism comprising:
      a second wing rod pivotally connecting to the stationary shell on a second pivoting axis and pivotally connecting to the second driving shaft, and having a second supporting surface and a second protruding end being slidably disposed in the second arc groove;
      a second lifting plate being fixed to the second wing rod and having a second lifting surface substantially contacting with the second supporting surface in parallel; and
      a second connecting rod being fixed to the second shaft and pivotally connecting to the second driving shaft, and having a second rod end being slidably disposed in the second sliding groove;
   a first panel body being disposed on one side of the stationary shell and linking up with the first driving shaft;
   a second panel body being disposed on another side of the stationary shell and linking up with the second driving shaft; and
   a flexible screen being disposed on the first panel body and second panel body and defining a flexible section, wherein the flexible screen includes a supporting plate connecting with the first panel plate and the second panel plate, and a multi-layer structure being disposed on the supporting plate, and wherein the supporting plate has a weakening structure corresponding to the flexible section;
   wherein the first panel body and the second panel body are transformed between an unfolded status and a folded status; and
   wherein when the first panel body and the second panel body are in the unfolded status, the flexible screen is flattened, and the first wing rod, the first lifting plate, the second wing rod, the second lifting plate and the stationary shell collectively support the flexible section; and when the first panel body and the second panel body are in the folded status, the weakening structure allows the flexible screen to bend at the flexible section, and the first wing rod, the first lifting plate, the second wing rod, the second lifting plate and the stationary shell collectively define a yielding space for accommodating the flexible section.

2. The foldable electronic device as claimed in claim 1, wherein when the first panel body and the second panel body are transformed from the unfolded status to the folded status, the first panel body drives the first driving shaft to rotate about the first rotating axis, the second panel body drives the second driving shaft rotate about the second rotating axis, the first protruding end and the second protruding end slide in the first arc groove and the second arc groove respectively, the first rod end and the second rod end slide in the first sliding groove and the second sliding groove respectively, the first connecting rod and the second connecting rod correspondingly rotate about the first central axis and the second central axis respectively, and the first wing rod and the second wing rod correspondingly rotate about the first pivoting axis and the second pivoting axis respectively so as to drive the first lifting plate and the second lifting plate respectively to rotate with respect to the stationary shell.

3. The foldable electronic device as claimed in claim 2, wherein the flexible section further has a first deformation area, a second deformation area and a third deformation area disposed between the first deformation area and the second deformation area, and wherein the first deformation area corresponds to the first panel body, the second deformation area corresponds to the second panel body, and the third deformation area corresponds to the central body.

4. The foldable electronic device as claimed in claim 3, wherein the weakening structure further has a plurality of first groove groups and a plurality of second groove groups respectively extending along a first longitudinal direction and alternately arranged with each other in a main longitudinal direction, wherein the first longitudinal direction is parallel to the first central axis and the second central axis, and perpendicular to the main longitudinal direction, and wherein the weakening structure is bent in the main longitudinal direction when the first panel body and the second panel body are transformed from the unfolded status to the folded status.

5. The foldable electronic device as claimed in claim 4, wherein each of the first groove groups has a plurality of first groove portions sequentially arranged along the first longitudinal direction, and each of the second groove groups has a plurality of second groove portions sequentially arranged along the first longitudinal direction, and wherein the first groove portion and the second groove portion, which are adjacent, are staggered from each other.

6. The foldable electronic device as claimed in claim 5, wherein each of the first groove portions has a first groove, and each of the second groove portions has a second groove, and wherein the first groove and the second groove penetrate through the supporting plate respectively.

7. The foldable electronic device as claimed in claim 6, wherein the first deformation area, the second deformation area and the third deformation area are continuously arranged.

8. The foldable electronic device as claimed in claim 7, wherein when the first panel body and the second panel body are in the unfolded status, the first lifting surface and the second lifting surface are substantially coplanar; and wherein when the first panel body and the second panel body are in the folded status, the first lifting surface and the second lifting surface are substantially spaced apart and in parallel.

9. The foldable electronic device as claimed in claim 8, wherein the first central axis, the second central axis, the first rotating axis, the second rotating axis, the first pivoting axis, and the second pivoting axis are not overlapping.

10. The foldable electronic device as claimed in claim 9, wherein the first driving shaft further has a first main body and a first protruding part, the first main body extends along the main longitudinal direction, the first protruding part is disposed on the first main body, the first arc groove extends from the first main body to the first protruding part, and the first sliding groove is formed on the first main body, and wherein the second driving shaft further has a second main body and a second protruding part, the second main body extends along the main longitudinal direction, the second protruding part is disposed on the second main body, the second arc groove extends from the second main body to the second protruding part, and the second sliding groove is formed on the second main body.

11. The foldable electronic device as claimed in claim 10, wherein the main longitudinal direction is perpendicular to the first central axis and the second central axis, wherein the first driving shaft further has a first embedding slot formed on the first main body and communicated with the first sliding groove, and the first connecting rod further has a first rod body connected with the first rod end and accommodated in the first embedding slot, and wherein the second driving shaft further has a second embedding slot formed on the second main body and communicated with the second sliding groove, and the second connecting rod further has a second rod body connected with the second rod end and accommodated in the second embedding slot.

12. The foldable electronic device as claimed in claim 11, wherein the first driving shaft is pivotally connected with the first connecting rod on a first connecting axis, and pivotally connected with the first wing rod on a first subordinate connecting axis, and wherein the second driving shaft is pivotally connected with the second connecting rod on a second connecting axis, and pivotally connected with the second wing rod on a second subordinate connecting axis.

13. The foldable electronic device as claimed in claim 12, wherein the first panel body comprises a first outer surface distant from the flexible screen, and the second panel body comprises a second outer surface distant from the flexible screen, wherein when the first panel body and the second panel body are in the unfolded status, a perpendicular line segment between the first subordinate connecting axis and the first pivoting axis is more distant from the first outer surface than a perpendicular line segment between the first connecting axis and the first central axis, and a perpendicular line segment between the second subordinate connecting axis and the second pivoting axis is more distant from the second outer surface than a perpendicular line segment between the second connecting axis and the second central axis; and wherein when the first panel body and the second panel body are in the folded status, the perpendicular line segment between the first subordinate connecting axis and the first pivoting axis is more adjacent to the first outer surface than the perpendicular line segment between the first connecting axis and the first central axis, and the perpendicular line segment between the second subordinate connecting axis and the second pivoting axis is more adjacent to the second outer surface than the perpendicular line segment between the second connecting axis and the second central axis.

14. The foldable electronic device as claimed in claim 13, wherein the first panel body further comprises a first side shell and a first support block and is disposed on one side of the stationary shell to be operatively linked with the first driving shaft, the first support block is disposed in the first side shell, and the first lifting plate is disposed between the first support block and the stationary shell to operate in the first side shell correspondingly, and wherein the second panel body further comprises a second side shell and a second support block and is disposed on the other side of the stationary shell to be operatively linked with the second driving shaft, the second support block is disposed in the second side shell, and the second lifting plate is disposed between the second support block and the stationary shell to operate in the second side shell correspondingly.

15. The foldable electronic device as claimed in claim 14, wherein the first panel body further comprises a first covering plate and a plurality of first inserting columns being formed on the first covering plate with intervals and passing through the flexible screen and the first support block to be fixed to the first side shell, wherein the second panel body further comprises a second covering plate and a plurality of second inserting columns being formed on the second covering plate with intervals and passing through the flexible screen and the second support block to be fixed to the second side shell, and wherein the first covering plate, the first side shell, the second covering plate and the second side shell hold the flexible screen collectively.

16. The foldable electronic device as claimed in claim 1, further comprising:
a first positioning module comprising:
a first driving cam being fixed to the first shaft, and having a first main-tooth;
a first driven cam slidably sleeved on the first shaft along the first central axis and having a first tooth space, a second tooth space and a first sub-tooth, the first sub-tooth located between the first tooth space and the second tooth space; and
a first elastic element disposed between the first driven cam and a fixed plate of the stationary shell;
wherein when the first panel body and the second panel body are in the unfolded status, the first main-tooth is located in the first tooth space; when the first panel body and the second panel body are in a half-folded status, the first main-tooth abuts against the first sub-tooth so that the first elastic element is compressed; and when the first panel body and the second panel body are in the folded status, the first main-tooth moves into the second tooth space, and the first elastic element is released.

17. The foldable electronic device as claimed in claim 16, further comprising:
a second positioning module comprising:
a second driving cam being fixed to the second shaft, and having a second main-tooth;
a second driven cam slidably sleeved on the second shaft along the second central axis and having a third tooth space, a fourth tooth space and a second sub-tooth, the second sub-tooth located between the third tooth space and the fourth tooth space; and
a second elastic element disposed between the second driven cam and the fixed plate of the stationary shell;
wherein when the first panel body and the second panel body are in the unfolded status, the second main-tooth is located in the third tooth space; when the first panel body and the second panel body are in the half-folded status, the second main-tooth abuts against the second sub-tooth so that the first elastic element and the second elastic element are compressed; and when the first panel body and the second panel body are in the folded status, the second main-tooth moves into the fourth tooth space, and the second elastic element is released.

18. The foldable electronic device as claimed in claim 17, further comprising a synchronous module, which has a first gear and a second gear, wherein the first gear is sleeved on the first shaft, the second gear is sleeved on the second shaft, and the first gear and the second gear are engaged with each other; and wherein when the first shaft rotates about the first central axis or the second shaft rotates about the second central axis, the first gear or the second gear rotates correspondingly and drives the second gear or the first gear to rotate so that the second shaft or the first shaft rotates synchronously with the second gear or the first gear correspondingly.

19. The foldable electronic device as claimed in claim 18, wherein the first shaft, the second shaft, the linkage unit, the first wing rod, the first connecting rod, the second wing rod, the second connecting rod, the first positioning module, the second positioning module and the synchronous module are duplicated and disposed on two sides of the stationary shell respectively and correspondingly.

* * * * *